(12) United States Patent
Rhee

(10) Patent No.: US 9,285,900 B2
(45) Date of Patent: Mar. 15, 2016

(54) TOUCH PEN USING DELAY DEVICE AND TOUCH INPUT METHOD THEREOF AND TOUCH INPUT SYSTEM AND METHOD THEREOF

(71) Applicant: Samsung Electronics Co., Ltd., Suwon-si, Gyeonggi-do (KR)

(72) Inventor: Bongjae Rhee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 85 days.

(21) Appl. No.: 14/063,711

(22) Filed: Oct. 25, 2013

(65) Prior Publication Data

US 2014/0118308 A1 May 1, 2014

(30) Foreign Application Priority Data

Oct. 25, 2012 (KR) ........................ 10-2012-0118947

(51) Int. Cl.
*G06F 3/033* (2013.01)
*G06F 3/0354* (2013.01)
*G06F 3/038* (2013.01)
*G06F 3/043* (2006.01)

(52) U.S. Cl.
CPC .......... *G06F 3/03545* (2013.01); *G06F 3/0383* (2013.01); *G06F 3/0433* (2013.01)

(58) Field of Classification Search
CPC ... G06F 3/033; G06F 3/0354; G06F 3/03545; G06F 2203/0384
See application file for complete search history.

(56) References Cited

U.S. PATENT DOCUMENTS

| | | | |
|---|---|---|---|
| 5,349,139 A * | 9/1994 | Verrier et al. | 178/19.04 |
| 2004/0169439 A1 * | 9/2004 | Toda | 310/328 |
| 2005/0171714 A1 * | 8/2005 | Ely et al. | 702/75 |
| 2008/0150917 A1 * | 6/2008 | Libbey et al. | 345/179 |
| 2008/0238879 A1 * | 10/2008 | Jaeger et al. | 345/173 |
| 2010/0085325 A1 * | 4/2010 | King-Smith et al. | 345/174 |
| 2011/0169756 A1 * | 7/2011 | Ogawa et al. | 345/173 |
| 2011/0254636 A1 * | 10/2011 | Chen et al. | 332/108 |
| 2011/0309897 A1 * | 12/2011 | Yamanaka | 333/195 |
| 2012/0223919 A1 | 9/2012 | Lin et al. | |

FOREIGN PATENT DOCUMENTS

| | | |
|---|---|---|
| KR | 2010-0138123 A | 12/2010 |
| KR | 2011-0012217 A | 2/2011 |
| KR | 2012-0054451 A | 5/2012 |
| WO | 01-31799 A1 | 5/2001 |

* cited by examiner

*Primary Examiner* — Mark Regn
(74) *Attorney, Agent, or Firm* — Jefferson IP Law, LLP

(57) ABSTRACT

A touch pen using a delay device and a touch input method thereof and a touch input system and a method thereof are provided. The touch pen includes a body, an antenna embedded on the body configured to receive a wireless signal from a mobile terminal, and a delay device configured to receive the wireless signal from the antenna and to output a reflection signal, corresponding to the received wireless signal, to the antenna after a predetermined time elapses, wherein the antenna transmits the reflection signal to the mobile terminal.

32 Claims, 19 Drawing Sheets

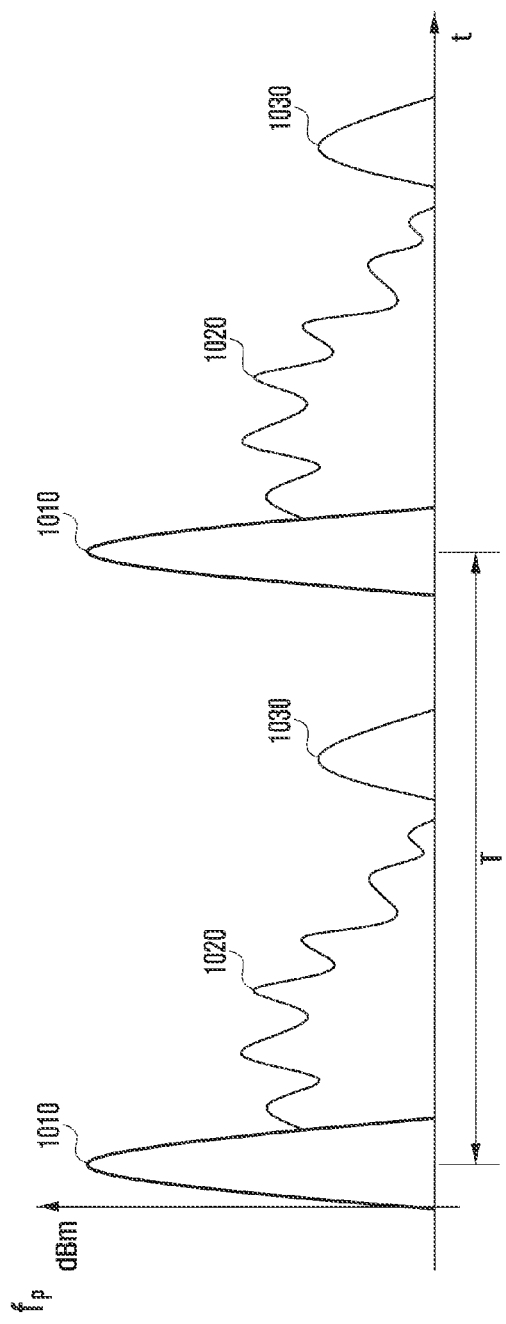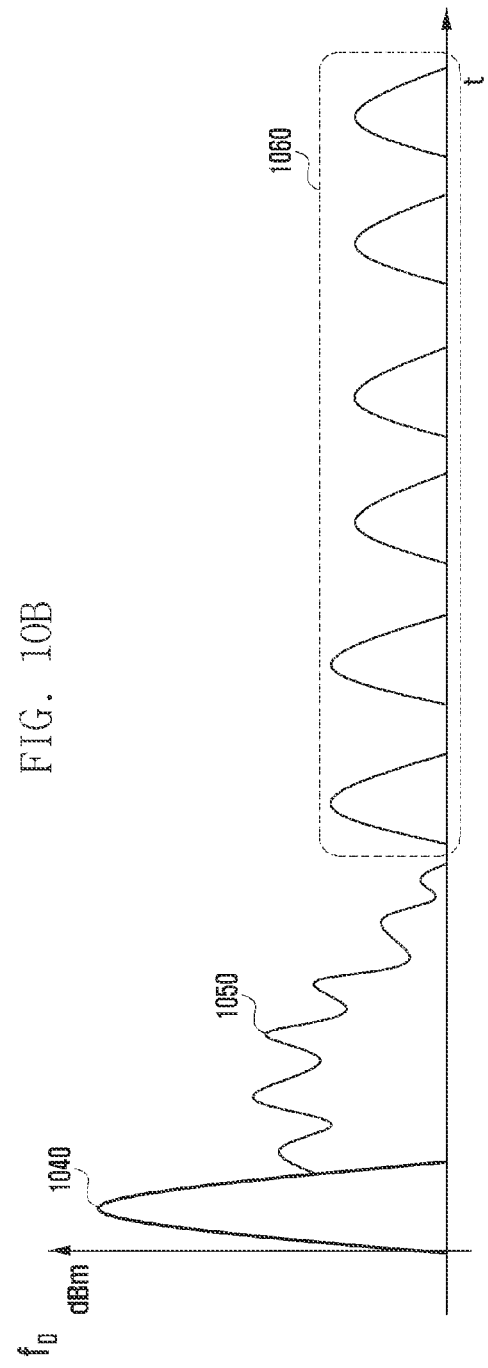

TOUCH PEN USING DELAY DEVICE AND TOUCH INPUT METHOD THEREOF AND TOUCH INPUT SYSTEM AND METHOD THEREOF

CROSS-REFERENCE TO RELATED APPLICATION(S)

This application claims the benefit under 35 U.S.C. §119 (a) of a Korean patent application filed on Oct. 25, 2012 in the Korean Intellectual Property Office and assigned Serial No. 10-2012-0118947, the entire disclosure of which is hereby incorporated by reference.

TECHNICAL FIELD

The present disclosure relates to a touch pen and a touch input method thereof and a touch input system and a method thereof. More particularly, the present disclosure relates to a touch pen using a delay device and a touch input method thereof and a touch input system and a method thereof.

BACKGROUND

Recently, mobile terminals equipped with a touch screen are widely used due to convenience of input and a slim shape. The touch screen provides an input and output function. To this end, the touch screen includes a display panel and a touch panel. The touch screen provides the output function through the display panel and provides the input function through the touch panel.

The mobile terminal supporting the touch screen recognizes not only a touch of hand but also a touch input device such as a stylus or a touch pen to provide detailed input. The touch pen is divided into an active type which needs power and a passive type which needs no power. The active type touch pen includes a power supply such as a battery. The active type touch pen operates an LC resonance circuit consisting of an inductor (L) and a capacitor (C) through the power supply. The mobile terminal receives a wireless signal generated in the LC resonance circuit of the touch pen by an antenna having an array shape embedded on the mobile terminal, and recognizes location of the touch pen by using reception strength for each antenna.

The passive type touch pen does not include an additional power supply and receives the power from a mobile terminal to operate by using electromagnetic induction. For example, the passive type touch pen using electromagnetic induction mainly utilizes an Electro Magnetic Resonance (EMR) by using the LC resonance circuit. The passive type touch pen utilizing the EMR by the LC resonance circuit receives a wireless signal from the mobile terminal through the LC resonance circuit and transmits a reflection signal corresponding to the received wireless signal to the mobile terminal. At this time, the mobile terminal receives the reflection signal which is transmitted from the LC resonance circuit of the touch pen by the embedded antenna of array shape, and recognizes location of the touch pen by measuring a reception strength corresponding to each antenna.

In the meantime, the touch pen of the EMR type using the LC resonance circuit provides status information such as a pen pressure, a button input, and the like through variation of a resonance frequency corresponding to the reflection signal. To this end, the related-art touch pen of the EMR type using the LC resonance circuit includes a capacitor, an inductor, a variable inductor, a variable capacitor, and the like in order to change the resonance frequency of the LC resonance circuit according to the pen pressure or the button input.

However, the above described related-art touch pen of the EMR type using the LC resonance circuit provides the status information such as the pen pressure, the button input and the like through only the change of the resonance frequency. Thus, the related-art touch pen of the EMR type using the LC resonance circuit has a limitation in the kind of status information that can be provided to the mobile terminal. In addition, the inductor, the capacitor, the variable inductor, and the variable capacitor used in the related-art touch pen of the EMR type using the LC resonance circuit has not only a large error due to the characteristic of the device but also has a high sensibility in the change of environment such as a temperature. Accordingly, the related-art touch pen of the EMR type using the LC resonance circuit has a problem in that a compensation circuit for compensating the error due to the change of the environment is required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a touch pen using a delay device and a touch input method thereof and a touch input system and a method thereof.

Another aspect of the present disclosure is to provide a touch pen using a delay device and a touch input method thereof and a touch input system and a method thereof capable of providing a mobile terminal with various status information of a touch pen such as a pen pressure, a button input, ID information, sensor information and the like through frequency variation and time delay.

Another aspect of the present disclosure is to provide a touch pen using a delay device and a touch input method thereof and a touch input system and a method thereof capable of providing a frequency for recognition of location information and a frequency for recognition of status information separately.

Another aspect of the present disclosure is to provide a touch pen using a delay device and a touch input method thereof and a touch input system and a method thereof capable of supporting multiple frequencies.

Another aspect of the present disclosure is to provide a touch pen using a delay device and a touch input method thereof and a touch input system and a method thereof capable of dividing a touch screen into a plurality of areas and simultaneously recognizing the plurality of divided areas with different frequencies.

In accordance with an aspect of the present disclosure, a touch pen is provided. The touch pen includes a body, an antenna embedded on the body configured to receive a wireless signal from a mobile terminal, and a delay device configured to receive the wireless signal from the antenna and to output a reflection signal, corresponding to the received wireless signal, to the antenna after a predetermined time elapses, wherein the antenna transmits the reflection signal to the mobile terminal.

In accordance with another aspect of the present disclosure, a touch input system is provided. The system includes a touch pen including an antenna and a delay device configured to receive a wireless signal through the antenna, to generate a reflection signal corresponding to the received wireless signal after a predetermined time elapses, and to transmit the generated reflection signal through the antenna, and a mobile terminal configured to transmit the wireless signal to the touch pen, to receive the reflection signal generated by the delay device, and to recognize location information and status information of the touch pen.

In accordance with another aspect of the present disclosure, a method of inputting a touch is provided. The method includes transmitting a wireless signal for recognizing location information and status information of a touch pen by a mobile terminal, receiving the wireless signal transmitted from the mobile terminal through an antenna by the touch pen, receiving the wireless signal from the antenna, outputting a reflection signal corresponding to the received wireless signal to the antenna after a predetermined time elapses by a delay device of the touch pen, transmitting the reflection signal to the mobile terminal through the antenna of the touch pen, receiving the reflection signal by the mobile terminal, and recognizing the location information and the status information of the touch pen by analyzing the reflection signal by the mobile terminal.

In accordance with another aspect of the present disclosure, a method of inputting a touch of a touch pen is provided. The method includes receiving a wireless signal through an antenna, delaying the received wireless signal for a predetermined time by using a delay device, outputting a reflection signal corresponding to the wireless signal to the antenna, and transmitting the reflection signal through the antenna.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 10A and 10B are diagrams illustrating a wireless signal which is received from a touch pen according to the second embodiment of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Before a detailed description, "a delay device" refers to a component which outputs an output signal after receiving an input signal and then a predetermined time elapses. The delay device includes a Surface Acoustic Wave (SAW) device, an SAW resonator, a Bulk Acoustic Wave (BAW), a Film Bulk Acoustic Resonator (FBAR), and a glass delay line and the like. In the following description, for the convenience of illustration, the SAW device is illustrated as an example.

Figure 1A:
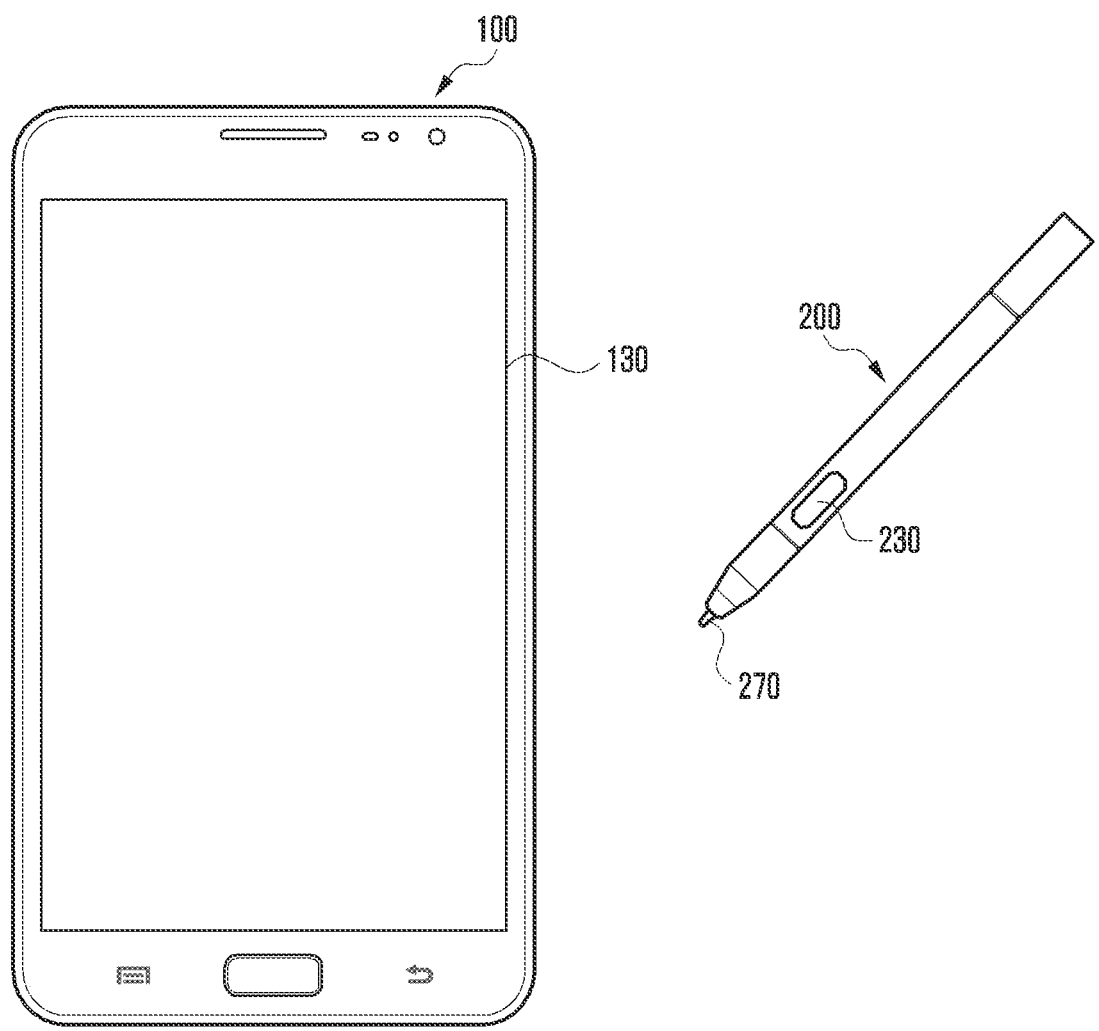
FIG. 1A shows a touch input system according to an embodiment of the present disclosure.

FIG. 1A shows a touch input system according to an embodiment of the present disclosure.

Referring to FIG. 1A, a touch input system of the present disclosure includes a touch pen 200 and a mobile terminal 100.

The touch pen 200 is a pen type input tool. Although the touch pen is described as an embodiment of the present disclosure, it should be understood by those skilled in the art that the present disclosure is not limited to the pen type touch pen 200 and various forms (e.g., an eraser type) may be applied. The touch pen 200 according to the present disclosure may be formed as a passive-type using the delay device (e.g., the SAW device). The passive-type touch pen 200 receives Radio Frequency (RF) signal from the mobile terminal 100 through an antenna, and transmits a reflection signal corresponding to the received wireless signal after a predetermined time elapses through the delay device.

At this time, the touch pen 200 transmits the reflection signal having an identical frequency with the received wireless signal to the mobile terminal 100 via the antenna, or transmits the reflection signal where at least one of frequency, amplitude, and phase is changed to the mobile terminal 100 via the antenna.

The touch pen 200 provides the mobile terminal 100 with status information such as a pressure (e.g., pen pressure) which is pressed to a pen nib 270, a button input through a button 230 and the like through variation of frequency, amplitude, and phase.

In the meantime, the touch pen 200 may provide the status information by using a time delay of the delay device. More specifically, the delay device of the touch pen 200 includes a plurality of Inter-Digital Transducers (IDTs) having a delay time which is differently set, and provides the status information corresponding to each IDT. For instance, the touch pen 200 provides pressure information through a first IDT having a first delay time, button input information through a second IDT having a second delay time, and IDentifier (ID) information of the touch pen 200 through a third IDT having a third delay time. The touch pen 200 of the present disclosure provides the status information by using not only the change of the frequency but also time delay, such that it may provide a variety of status information compared with the related-art touch pen of the electromagnetic resonance type using a LC resonance circuit.

The touch pen 200 may separately provide a frequency for providing location information and a frequency for providing status information. Moreover, the touch pen 200 may support multiple frequencies corresponding to a frequency for providing location information and a frequency for providing status information. The touch pen 200 will be described later in detail.

The mobile terminal 100 includes a touch screen 130. The touch screen 130 of the mobile terminal 100 is formed by combining a first touch panel with a second touch panel, when the first touch panel recognizes a general touch input or a proximity touch input by a user's finger, stylus, and the like, and the second touch panel recognizes a general touch input or a proximity touch input by the touch pen 200. Alternatively, the first touch panel and the second touch panel may be implemented as an integral type. The first touch panel may be formed of a capacitive type, a resistive type, an ultra-sonic wave type, and an infra-red type and the like. The second touch panel may be formed of a touch panel having an Electro Magnetic Resonance (EMR) type.

Here, the touch input refers to an input recognizing a contact of the touch screen 130 with an input tool (e.g., a touch pen 200, a finger, a stylus and the like), and the proximity touch input refers to an input recognizing a state where the input tool approaches to the touch screen 130 within predetermined distant, (e.g., 1-2 cm), e.g., a hovering state. Since the above described various types of the touch panel are well known to those skilled in the art, a more detailed description is omitted.

The mobile terminal 100 recognizes location information of the touch pen 200 and various status information such as a pen pressure, button input, ID, and the like provided by the touch pen 200. To this end, the mobile terminal 100 transmits a wireless signal to the touch pen 200 and receives a reflection signal corresponding to the wireless signal from the touch pen 200. At this time, the mobile terminal 100 recognizes status information through variation of at least one of frequency, amplitude, and phase of the received reflection signal. Moreover, the mobile terminal 100 recognizes status information provided by the touch pen 200 through a plurality of reflection signals received sequentially with time delay.

The mobile terminal 100 may differently set a wireless signal of frequency for recognizing location information (hereinafter, referred to as a first frequency, fp) and a frequency for recognizing status information (hereinafter, referred to as a second frequency, fd). For example, the mobile terminal 100 transmits a wireless signal of the first frequency to recognize location information of the touch pen 200 and then transmits a wireless signal of the second frequency to recognize status information of the touch pen 200.

In addition, when the touch pen 200 supports multiple frequencies, the mobile terminal 100 measures a noise level corresponding to the multiple frequency bands which the touch pen 200 supports and controls to use the frequency having the best Signal-to-Noise Ratio (SNR) among the multiple-frequencies. In addition, when supporting the multiple-frequencies corresponding to the first frequency (fp) for recognizing location information and the second frequency (fd) for recognizing status information, the mobile terminal 100 measures the noise level and selects the first frequency (fp) and the second frequency (fd) having the best signal-to-noise ratio respectively.

Moreover, the mobile terminal 100 divides the touch screen 130 into a plurality of areas, and scans a plurality of the areas simultaneously through the wireless signal having a different frequency. The scan speed of the present disclosure can be improved by simultaneously scanning each a plurality of areas by using multiple-frequencies. The method of recognizing the touch pen 200 by simultaneously scanning the plurality of areas at the same time with multiple-frequencies is useful when the number of sensing lines of horizontal and vertical axis is increased due to the increase of screen size or resolution. The above mentioned mobile terminal 100 is described further below.

Figure 1B:
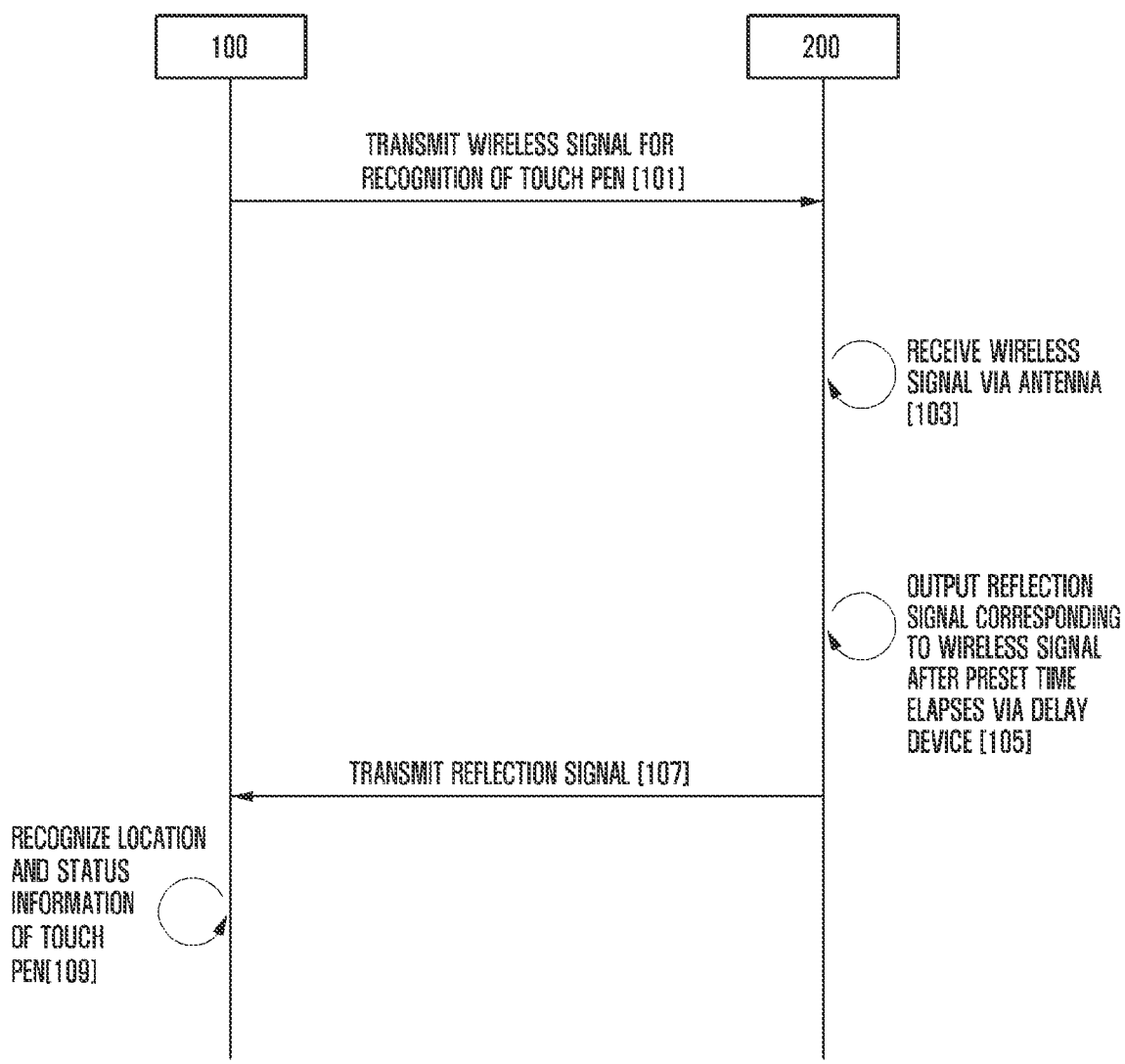
FIG. 1B is a flowchart illustrating a method of touch input according to an embodiment of the present disclosure.

FIG. 1B is a flowchart illustrating a method of touch input according to an embodiment of the present disclosure.

Referring to FIG. 1B, a mobile terminal 100 according to an embodiment of the present disclosure transmits a wireless signal for recognizing a touch pen 200 to the touch pen 200 in operation 101. At this time, the mobile terminal 100 only transmits the wireless signal in case of a request for touch recognition. For example, the mobile terminal 100 is able to transmit the wireless signal only when the touch screen 130 is turned on.

An antenna of the touch pen 200 receives the wireless signal which the mobile terminal 100 transmits in operation 103. After that, a delay device of the touch pen 200 receives the wireless signal and outputs a reflection signal corresponding to the received wireless signal to the antenna after a predetermined time elapses 105. More specifically, an input IDT of the delay device converts an electric signal which is input from the antenna into a surface acoustic wave which is a mechanical oscillation signal to transfer to an output IDT, and the output IDT reconverts the converted surface acoustic wave into an electric signal.

Then, the output IDT generates a reflection signal corresponding to the reconverted electric signal and converts the generated reflection signal (e.g., an electric signal) into a surface acoustic wave to transfer to the input IDT. The IDT reconverts the transferred surface acoustic wave into an electric signal to output to the antenna. At this time, the surface acoustic wave has the speed of approximately $3*10^3$ m/s and the wireless signal has a transmission speed of approximately $3*10^8$ m/s. In the present disclosure, time delay is generated because the electric signal is converted into the surface acoustic wave which is about 100,000 times slower.

Next, the antenna of the touch pen 200 transmits the reflection signal to the mobile terminal 100 in operation 107. The mobile terminal 100 which received the reflection signal recognizes location and status information of the touch pen 200 in operation 109.

Figure 2:
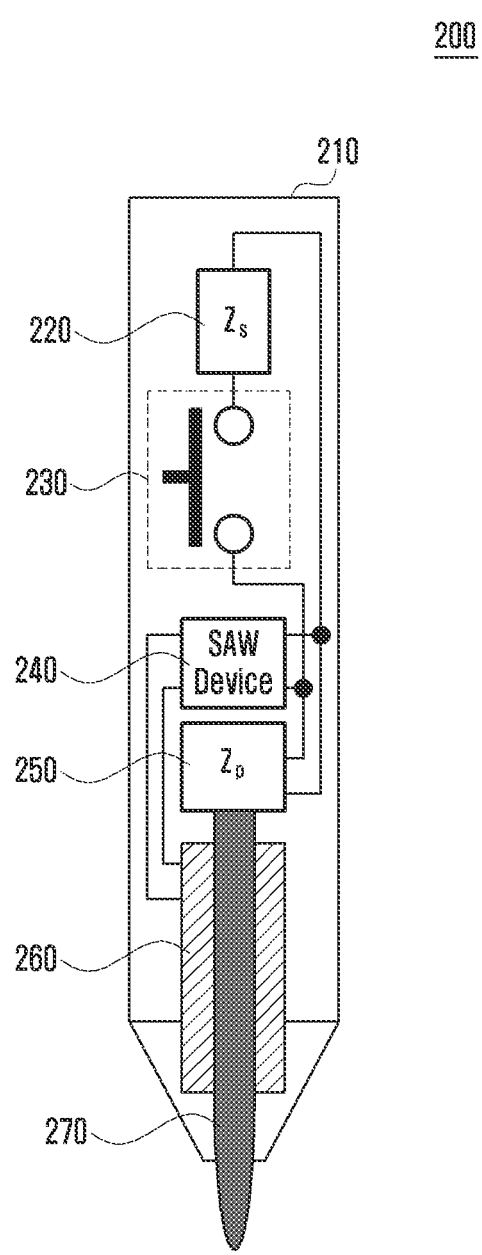
FIG. 2 is a view schematically illustrating a configuration of a touch pen according to a first embodiment of the present disclosure.
Figure 3A:
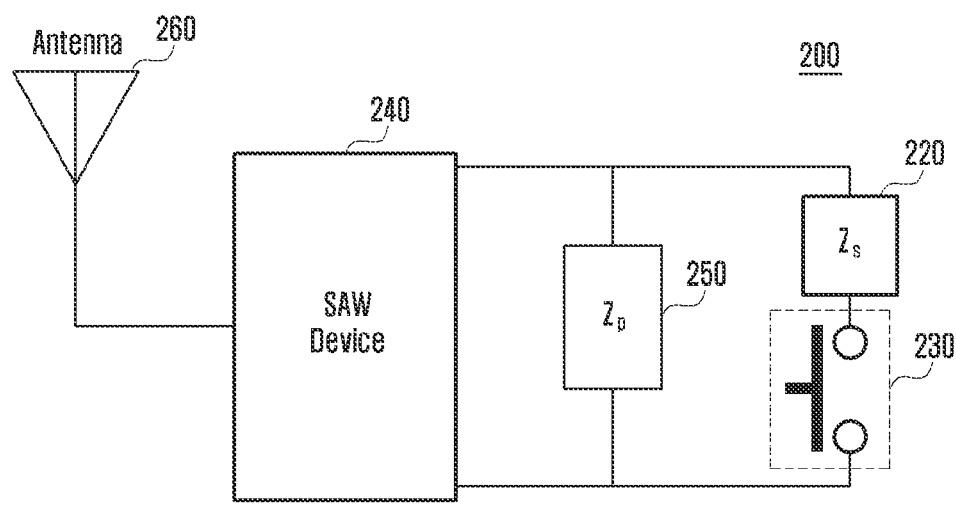
FIGS. 3A and 3B show an equivalent circuit of a touch pen according to the first embodiment of the present disclosure and related-art touch pen.
Figure 3B:
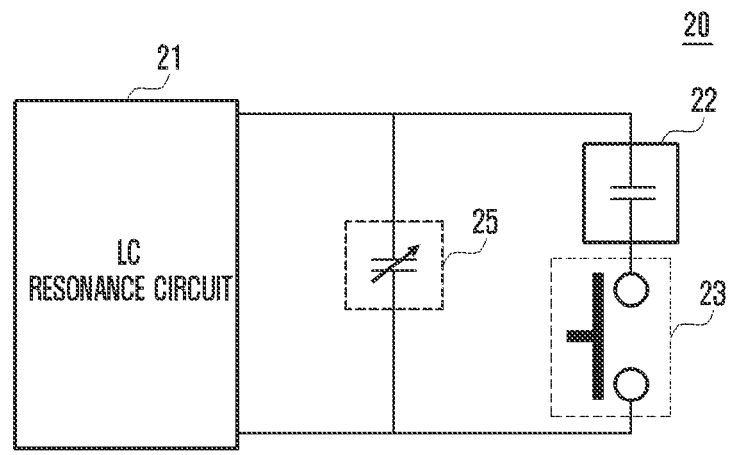

FIG. 2 is a view schematically illustrating a configuration of a touch pen according to the embodiment of the present disclosure, and FIGS. 3A and 3B show an equivalent circuit of a touch pen according to the embodiment of the present disclosure and related-art touch pen.

Referring to FIGS. 2, 3A and 3B, the touch pen 200 includes a body 210, an impedance device 220, a button 230, a delay device 240, a pressure sensor 250, an antenna 260, and a pen nib 270.

The body 210 is an external case of the touch pen 200. The body 210 may have a pen shape. The antenna 260 transmits and receives a wireless signal to the mobile terminal 100. More specifically, the antenna 260 receives the wireless signal from the mobile terminal 100 to provide to the delay device 240, and transmits a reflection signal corresponding to the wireless signal outputted from the delay device 240 to the mobile terminal 100.

The delay device 240 outputs an inputted signal after delaying the input signal for predetermined time. The delay device 240 may be formed of a SAW, an SAW resonator, a BAW, a FBAR, a glass delay line and the like. The delay device 240 according to the present disclosure is connected to an antenna 260 and receives a wireless signal provided from the mobile terminal 100 via the antenna 260.

The delay device 240 which received the wireless signal provided from the mobile terminal 100 outputs a reflection signal having the same frequency after a predetermined time elapses to the antenna 260, or outputs a reflection signal where at least one of frequency, amplitude, and phase is changed to the antenna 260. The frequency, amplitude, and phase of the reflection signal are changed according to a pen pressure sensed by a pressure sensor 250 or an impedance device 220 connected to the delay device 240 upon input of a button 230.

The delay time is able to be controlled by the delay device 240. In addition, the delay time is set according to each IDT when the delay device 240 includes a plurality of IDTs. The detailed structure of the delay device 240 is illustrated later with reference to FIGS. 4 to 8.

The impedance device 220 is a device to recognize the input of the button 230. When the button 230 is pushed, as shown in FIGS. 3A, the impedance device 220 is connected to the delay device 240 and a pressure sensor 250 in parallel. In other words, impedance of the touch pen 200 varies when the button 230 is pushed. The variation of impedance changes at least one of frequency, amplitude, and phase of the reflection signal output from the touch pen 200 to the mobile terminal 100. The touch pen 200 provides the mobile terminal 100 with input information of the button 230 by changing at least one of frequency, amplitude, and phase of the reflection signal. The impedance device 220 includes at least one of a resistor, an inductor, and a capacitor.

The button 230 may be configured with a switch, but the present disclosure is not limited thereto. The button 230 is a device for easily executing a specific function (e.g., memo, backward, forward, screen capture, mode change, and the like) of the mobile terminal 100 through the touch pen 200. For example, when the button 230 is not pushed, the mobile terminal 100 performs a first function in response to the touch input and when the button 230 is pushed, the mobile terminal 100 performs a second function in response to the touch input.

For example, when a drag of touch pen 200 from right to left is recognized without pushing the button 230 on a web page screen, the mobile terminal 100 performs a movement function of the web page. On the other hand, when a drag of touch pen 200 from right to left is recognized with pushing the button 230 on a web page screen, the mobile terminal 100 performs a backward function of moving to a previous web page.

The pressure sensor 250 changes the impedance according to a pen pressure which is pressed to a pen nib 270 of the touch pen 200 (hereinafter referred to a pen pressure). To this end, the pressure sensor 250 includes a variable resistor, a variable inductor, a variable capacitor, etc. The pressure sensor 250 is connected to the delay device 240 and an impedance device 220 in parallel.

The pen nib 270 is a part to contact on a touch screen 130 and may have a pointed shape. The pen nib 270 may move by the force pressed by a user to press the pressure sensor 250 and move to a default position when the force pressed by a user is eliminated.

Referring to FIGS. 3A and 3B, when comparing a related-art touch pen 20 employing electromagnetic resonance by using the LC resonance circuit with a touch pen 200 according to the present disclosure, the related-art touch pen 20 employing electromagnetic resonance by using the LC resonance circuit includes an LC resonance circuit 21, a variable capacitor 25, a capacitor 22, and a button 23. The related-art touch pen 20 having such configuration receives a wireless signal from a mobile terminal through the LC resonance circuit 21. Then, the LC resonance circuit 21 of the related-art touch pen 20 transmits a reflection signal corresponding to the received wireless signal to the mobile terminal. In this case, when a pen nib of the related-art touch pen 20 is pressed to change a value of the variable capacitor 25, or a capacitor 22 is connected to the LC resonance circuit 21 in parallel as a button 23 is pressed, the resonance frequency is changed. In other words, the related-art touch pen 20 of employing electromagnetic resonance by using the LC resonance circuit 21 receives the wireless signal through the LC resonance circuit 21 from the mobile terminal, and transmits a reflection signal corresponding to the wireless signal, and provides the mobile terminal with status information such as the pen pressure or the button input through resonance frequency variation of the reflection signal.

In contrast, the touch pen 200 having the configuration described above according to the present disclosure receives a wireless signal through an antenna 260 from the mobile terminal 100. Then, the wireless signal received from the antenna 260 is reflected to the mobile terminal 100 through the antenna 260 after a predetermined time (e.g., a few microseconds (μsec)) elapses. At this time, when a pen pressure is detected by the pressure sensor 250 or a button 230 is pushed, at least one of frequency, amplitude, and phase of the reflection signal is changed. The touch pen 200 according to the present disclosure provides the mobile terminal 100 with the status information through variation of at least one of frequency, amplitude, and phase.

Meanwhile, although the delay device 240 and the pressure sensor 250 are separately illustrated in FIGS. 2 and 3A, the delay device 240 and the pressure sensor 250 may be configured as an integral type. Moreover, in FIGS. 2 and 3A, the button 230 is connected with the impedance device 220 in serial and with the pressure sensor 250 in parallel, but the present disclosure is not limited thereto. For example, in another embodiment of the present disclosure, the button 230 and the impedance device 220 may be connected in parallel, and the pressure sensor 250 and the impedance device 220 may be connected in serial. Furthermore, it is illustrated that the touch pen 200 includes one button 230, but the touch pen 200 may include a plurality of buttons.

FIGS. 4, 5, 6, 7A, 7B, and 8 show various configurations of a delay device of a touch pen according to an embodiment of the present disclosure.

Figure 4:
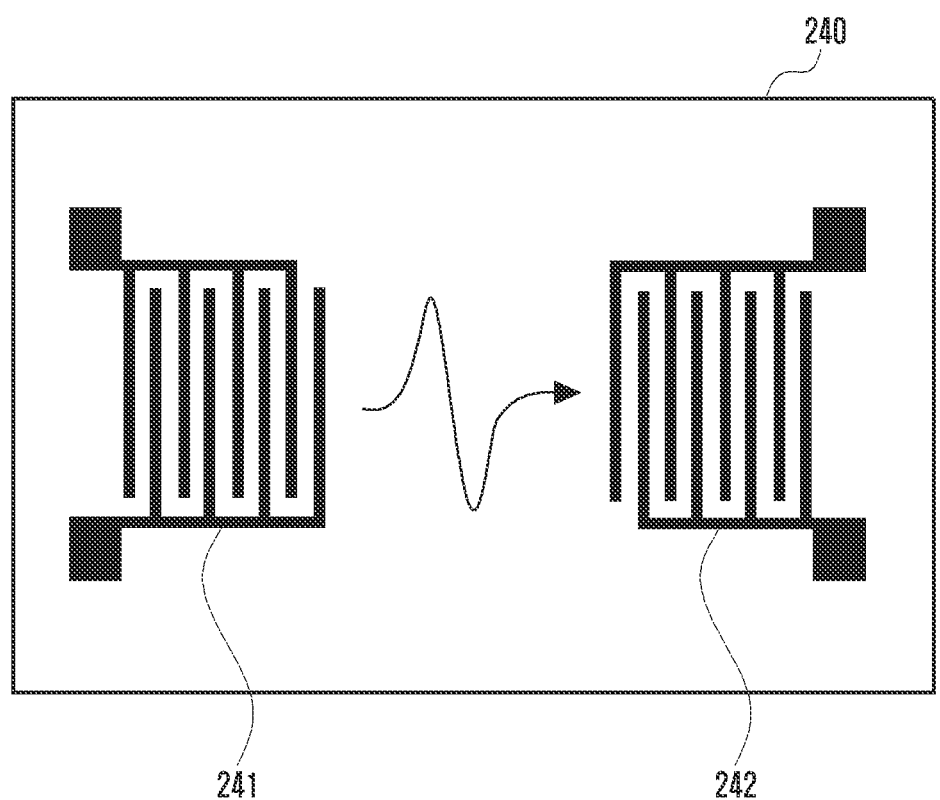
FIGS. 4, 5, 6, 7A, 7B, and 8 show various configurations of a delay device of a touch pen according to the first embodiment of the present disclosure.

Referring FIG. 4, the delay device 240 according to the present disclosure includes an input IDT 241 and an output IDT 242. The input IDT 241 and the output IDT 242 may be spaced apart with a given distance from each other.

The input IDT 241 and the output IDT 242 are formed by patterning on a substrate of a piezoelectric material. Generally, as shown in FIG. 4, the input IDT 241 and the output IDT 242 have a finger structure, and the operation frequency is determined according to a width of the finger and a distance between the fingers. Moreover, the input IDT 241 and the output IDT 242 may have the operation frequency of 30 MHz to 3 GHz, and a high Q factor. The wireless signal transmitted from the mobile terminal 100 propagates with a speed of the light (approximately $3*10^8$ m/s), and the surface acoustic wave propagates with a speed of $3*10^3$ m/s.

The delay device 240 causes the lowering of speed of about 100,000 times. Thus, the mobile terminal 100 of the present disclosure receives the reflection signal from the touch pen 200 after removing a reflection wave caused by external factors. Accordingly, in the present disclosure, a signal-to-noise rate may be increased and touch performance may be improved.

In the meantime, although not illustrated in FIG. 4, the input IDT 241 is connected to the antenna 260. The output IDT 242 may be connected to the pressure sensor 250, the button 230 or the like, if necessary.

The input IDT 241 converts the electric signal applied from outside into the surface acoustic wave. The output IDT 242 reconverts the surface acoustic wave transferred from the input IDT 241 into the electric signal. After that, the output IDT 242 converts the electric signal into the surface acoustic wave to transfer to the input IDT 241. At this time, the input IDT 241 converts the surface acoustic wave into the electric signal to output to the antenna 260.

Figure 5:
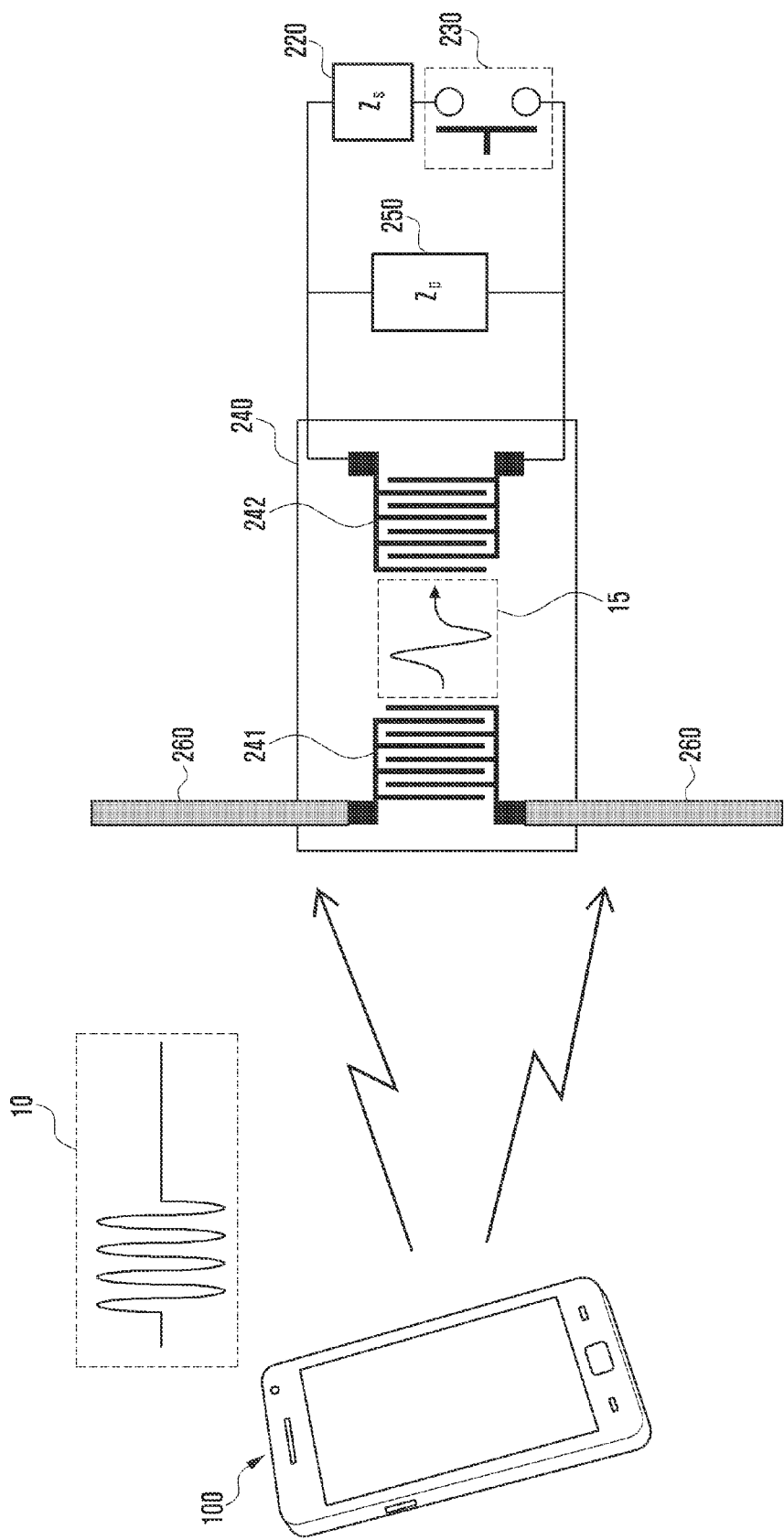

Referring to FIG. 5, the delay device 240 according to another embodiment of the present disclosure includes an input IDT 241 and an output IDT 242, and the output IDT 242 may be connected with a pressure sensor 250, an impedance device 220, and a button 230.

When the mobile terminal 100 transmits a wireless signal (hereinafter referred to a transmission signal 10) of a specific frequency, the touch pen 200 receives the transmission signal 10 through the antenna 260. At this time, the transmission signal 10 is converted into an electric signal to input to the input IDT 241, and the input IDT 241 converts the input electric signal into a surface acoustic wave 15 and the surface acoustic wave 15 is transmitted to the output IDT 242. The output IDT 242 reconverts the surface acoustic wave 15 into an electric signal. At this time, at least one of frequency, amplitude, and phase of the reconverted electric signal may be modulated according to the impedance change of the pressure sensor 250 or the load impedance change of the output IDT 242 due to a button 230 input.

Figure 6:
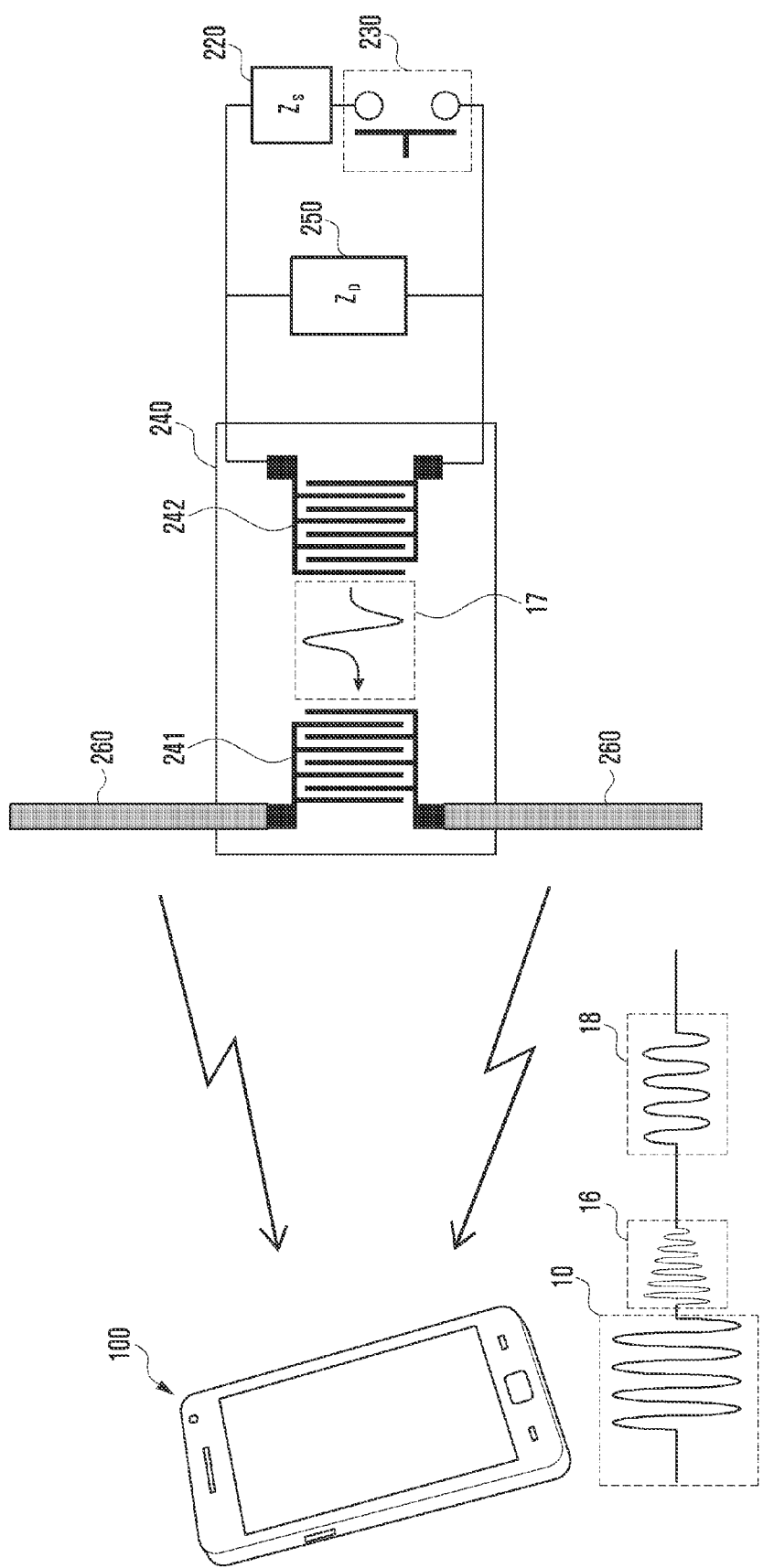

Referred to FIG. 6, the output IDT 242 converts the electric signal into the surface acoustic wave 17 and retransmits to the input IDT 241. At this time, the input IDT 241 converts the retransmitted surface acoustic wave 17 into an electric signal and outputs to the antenna 260. The antenna 260 transmits the electric signal to the mobile terminal 100. The mobile terminal 100 receives a reflection signal (hereinafter referred to a reception signal 18) corresponding to the transmitted wireless signal. Referring to a diagram of signal waveform of FIG. 6, the mobile terminal 100 transmits the transmission signal 10 to the touch pen 200 and receives the reception signal 18 from the touch pen 200 after a predetermined time elapses.

When comparing the waveform of the transmission signal 10 with the waveform of the reception signal 18, it can be known that the amplitude of the reception signal 18 is reduced. The mobile terminal 100 may recognize the pen pressure and the inputting of the button through a reduction rate of the amplitude. The amplitude reduction amount of the reception signal 18 is changed depending on the load impedance change of the output IDT 242 by the pressure sensor 250 and the impedance device 220.

As the transmission signal 10 is transmitted and the reception signal 18 is received after a predetermined time elapses, in the present disclosure, the reflection wave 16 which is generated by environmental factors just after transmitting the transmission signal 10 is not mixed into the reception signal 18. On the contrary, when using the touch pen using the related-art LC resonance circuit, the mobile terminal 100 receives the reception signal within a very short time (close to almost zero seconds) after transmission of the transmission signal such that the reflection wave is included in the reception signal. Thus, in the present disclosure, the signal-to-noise rate is improved compared to the related-art touch pen employing electromagnetic resonance using the LC resonance circuit.

In the meantime, FIG. 6 shows an example of amplitude change of the reception signal 18, but the present disclosure is not limited thereto. That is, the frequency and the phase of the reception signal 18 may be changed.

Figure 7A:
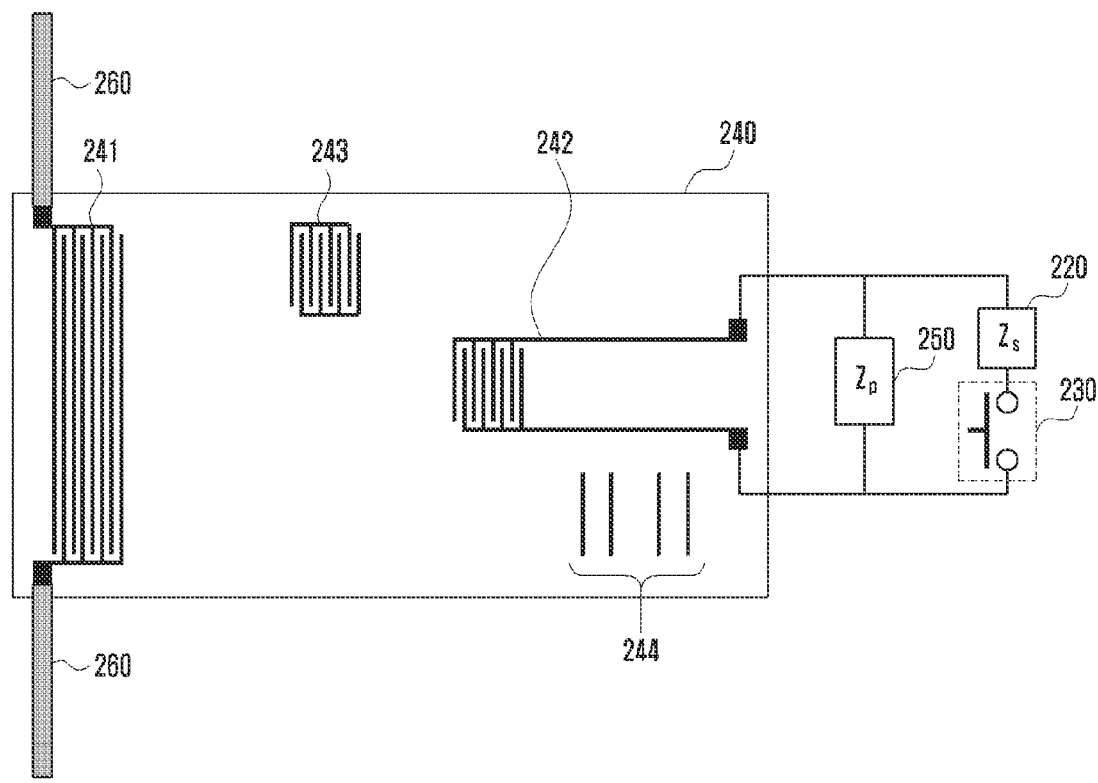

Referring to FIG. 7A, a delay device 240 according to another embodiment of the present disclosure includes an input IDT 241 connected to an antenna 260, an output IDT 242, a reference IDT 243, and a reflector 244 for providing ID information, and the output IDT 242 may be connected to a pressure sensor 250, an impedance device 220, and a button 230. The reference IDT 243 is a device for compensation of error according to external environment such as temperature. That is, the error caused by environmental factors such as the change of temperature and pressure may be prevented by using a difference value between the reception signal by the reference IDT 243 and the reception signal by the output IDT 242, a difference value between the reception signal by the reference IDT 243 and the reception signal by the reflector 244. In other words, since the reception signal by the reference IDT 243, the reception signal by the output IDT 242, and the reception signal by the reflector 244 are identically affected by the temperature, the occurrence of error due to temperature can be avoided when using the difference value.

The reflector 244 may provide ID information of the touch pen 200. The present disclosure may provide a Radio Frequency ID (RFID) function by using the reflector 244. The reflector 244 is plurally configured and the arrangement of the plurality of the reflectors is changed according to a unique ID.

More specifically, the gap between reflectors may be differentiated or reflectors having a different reflection coefficient may be arranged.

When an ID of the touch pen 200 is formed of "1" and "0", the reflector 244 having a reflection coefficient corresponding to "1" and the reflector having a reflection coefficient corresponding to "0" may be arranged properly according to the ID of the touch pen 200. For example, when the ID of the touch pen 200 is "1001", a reflector having a reflection coefficient corresponding to "1", a reflector having a reflection coefficient corresponding to "0", a reflector having a reflection coefficient corresponding to "0", and a reflector having a reflection coefficient corresponding to "1" may be arranged in a row. At this time, the mobile terminal 100 recognizes ID information of the touch pen 200 by analyzing the reflection signal of reflectors arranged in a row.

Figure 7B:
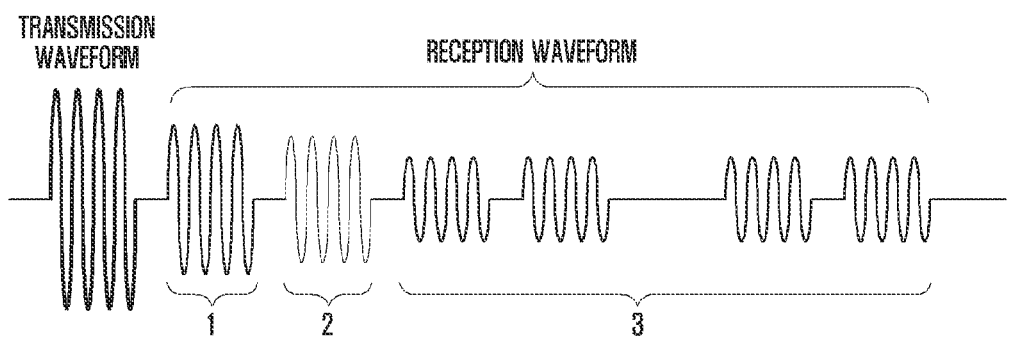

Referring to FIG. 7B, the mobile terminal 100 first receives a reference signal 1 by the reference IDT 243 after a wireless signal is transmitted and a predetermined time is elapsed, and then receives a location signal 2 by the output IDT 242 and receives a ID signal 3 by the reflector 244. The location signal 2 is used to recognize a location of the touch pen 200. In addition, variation of frequency, amplitude, and phase of the location signal 2 is used for the recognition of pen pressure information or button input information. In addition, the ID signal 3 has 4 waveforms according to the number of reflectors. When the delay device 240 includes a plurality of IDTs and reflectors, the present disclosure provides status information with time delay by differently setting delay time by the plurality of IDTs and the reflectors. That is, the touch pen 200 of the present disclosure provides the mobile terminal 100 with status information not only by changing at least one of frequency, amplitude, and phase but also by delaying time. For example, when the touch pen 200 of the present disclosure has a configuration like FIG. 7A, the mobile terminal 100 may recognize the location information and ID information through a reference signal 1, a location signal 2, and an ID signal 3 which are sequentially received with time delay, and recognize pen pressure information and/or input information of the button 230 through the change of at least one of frequency, amplitude, and phase of the location signal 2. As described above, the present disclosure can provide more various status information compared with the related-art touch pen employing electromagnetic resonance using the LC resonance circuit which provides status information only by using a change of frequency.

In the meantime, the present disclosure in not limited to the reception order of signal shown in FIG. 7B. The reception order of the reference signal 1, the status signal 2, and the ID signal 3 may be changed according to the arrangement or time delay value of the reference IDT 243, the output IDT 242, and the reflector 244.

Figure 8:
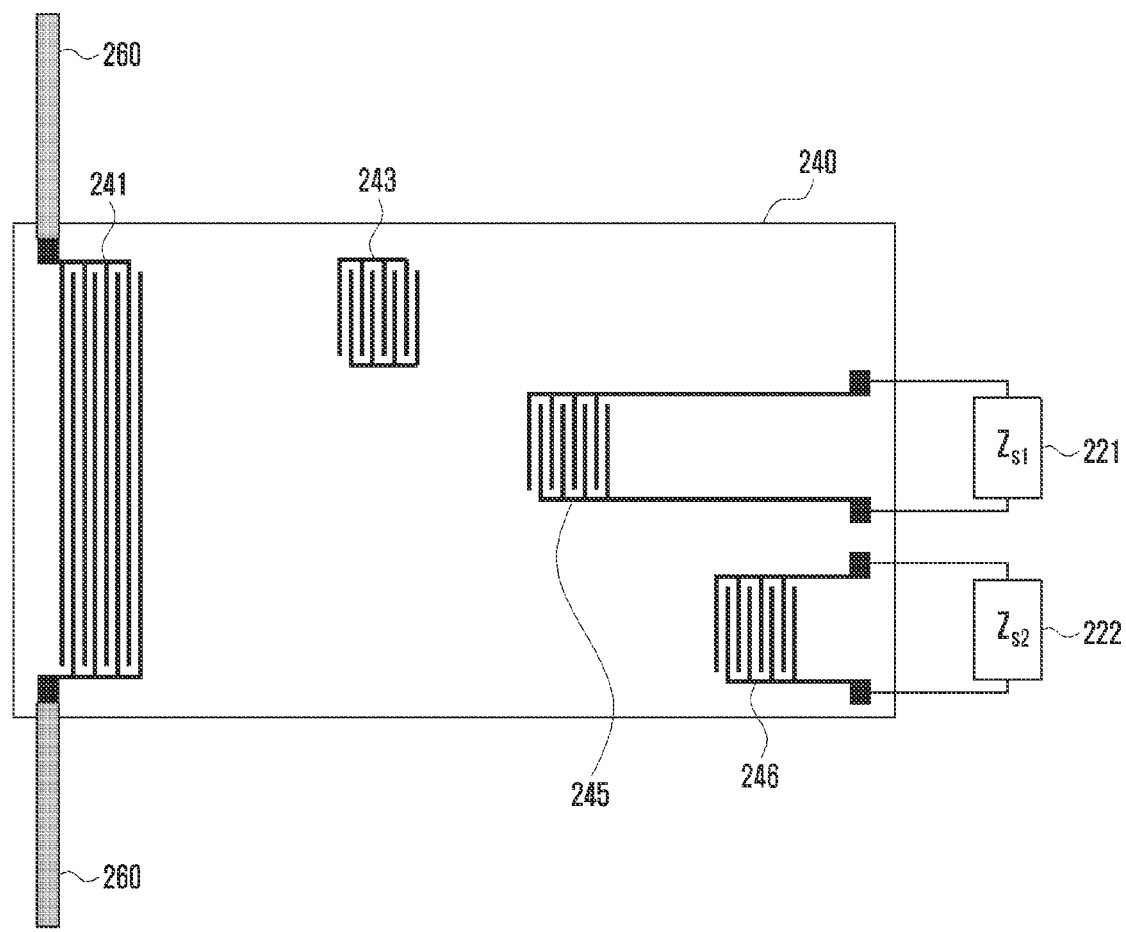

Referring to FIG. 8, a delay device 240 according to another embodiment of the present disclosure includes an input IDT 241 connected to an antenna 260, a first sensor IDT 245, a second sensor IDT 246, and a reference IDT 243. The delay device 240 of the touch pen 200 shown in FIG. 8 includes a plurality of sensor IDTs. At this time, the first sensor IDT 245 and the second sensor IDT 246 are connected to various sensors 221, 222 respectively, and provides the mobile terminal 100 with sensor information collected by the various sensors 221, 222.

For example, the first sensor IDT 245 may be connected to a pressure sensor and the second sensor IDT 246 may be connected to a switch. As described above, the touch pen 200 of the present disclosure shown in FIG. 8 can provide the mobile terminal 100 respectively with status information such as pen pressure, button input, and the like not by using one output IDT like the previous embodiment, but by using a plurality of output IDTs. Moreover, the touch pen of FIG. 8 can further include reflectors for providing ID information of the touch pen as described above with reference to FIGS. 7A and 7B. In the meantime, since other configurations of FIG. 8 are described in FIGS. 4 to 7B, a detailed description thereof is omitted.

In the meantime, for convenience of illustration, in FIGS. 7A, 7B, and 8, the IDTs (the reference IDT 243, the output IDT 242, the reflector 244, the first sensor IDT 245, the second sensor IDT 246, and the like) are arranged in multiple rows, but the present disclosure is not limited thereto. For example, the IDTs may be arranged in a line. That is, various methods used in the fabrication of a SAW device can be used to the IDTs.

Figure 9:
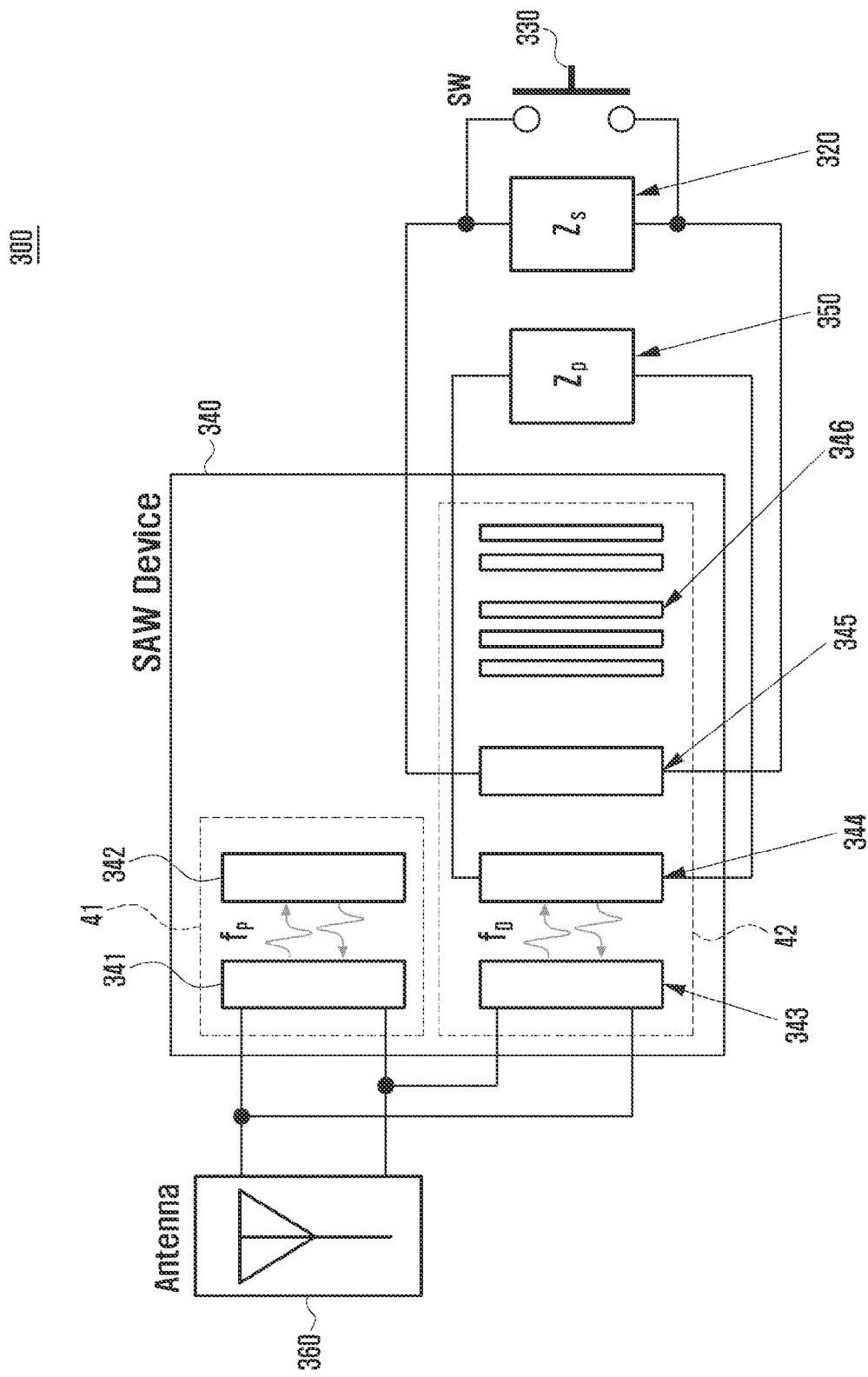
FIG. 9 shows an equivalent circuit of a touch pen according to a second embodiment of the present disclosure.

FIG. 9 show an equivalent circuit of a touch pen according to a second embodiment of the present disclosure.

Referring to FIG. 9, the touch pen 300 according to another embodiment of the present disclosure includes an antenna 360, a delay device 340, a pressure sensor 350, an impedance device 320 and a button 330.

The touch pen 300 according to the second embodiment of the present disclosure having such a configuration separates a first frequency fp for recognizing location information and a second frequency fd for recognizing status information. Thus, the accuracy of location detection of the touch pen 300 can be increased. More specifically, the mobile terminal 100 scans several times in a predetermined scan time to reduce misrecognition of touch. However, the period of reception signal becomes longer when location information and status information are provided by using one frequency like the touch pen 200 according to the first embodiment of present disclosure. When the period of reception signal becomes longer, the number of scans during the scan time is to be decreased and the decrease of the number of scans causes a problem that the touch location cannot be recognized accurately.

Meanwhile, when increasing the scan time for maintaining the same number of scans, the response speed of touch may be lowered. To address this problem, the delay device 340 includes a location information provider 41 providing location information and status information provider 42 providing status information. The location information provider 41 includes a first input IDT 341 and a first output IDT 342 operating by the first frequency fp.

The status information provider 42 may include a second input IDT 343, a second output IDT 344, a third output IDT 345, and a reflector 346 operating by the second frequency fd. The touch pen 300 according to the second embodiment of the present disclosure operates similarly to the touch pen 200 according to the first embodiment except for supporting the first frequency fp for providing location information and the second frequency fd for providing status information. Thus, a detailed description is omitted.

FIGS. 10A and 10B are diagrams illustrating a method of recognizing location information and status information of a touch pen according to the second embodiment of the present disclosure.

Referring to FIG. 10A, the mobile terminal 100 transmits a wireless signal 1010 of a first frequency fp with preset numbers according to a preset period T. After that, the mobile terminal 100 receives a reflection wave 1020 due to an environmental factors and a reflection signal 1030 by the touch pen 300. Particularly, the reflection signal 1030 is received after the reflection wave 1020 has disappeared. Thus, the present disclosure can prevent touch errors by improving a signal-to-noise ratio.

When the transmission of the first frequency fp is completed, the mobile terminal 100 as shown in FIG. 10B transmits a wireless signal 1040 of the second frequency fd, and receives a reflection wave 1050 due to the environmental factors and the reflection signal 1060 by the wireless signal 1040 of the second frequency fd. For example, the reflection signal 1060 includes a second output IDT 344, a third output IDT 345, and a reflector 346. Thus, the present disclosure provides status information of the touch pen 300 by using time delay. In other words, the present disclosure provides more various status information compared with the related-art touch pen employing electromagnetic resonance by using the LC resonance circuit which provides status information only by using a change of frequency.

As described above, the second embodiment of the present disclosure can provide location information faster than the first embodiment and avoid recognition error by providing location information by using the first frequency fp for providing location information and status information by using the second frequency fd.

Figure 11:
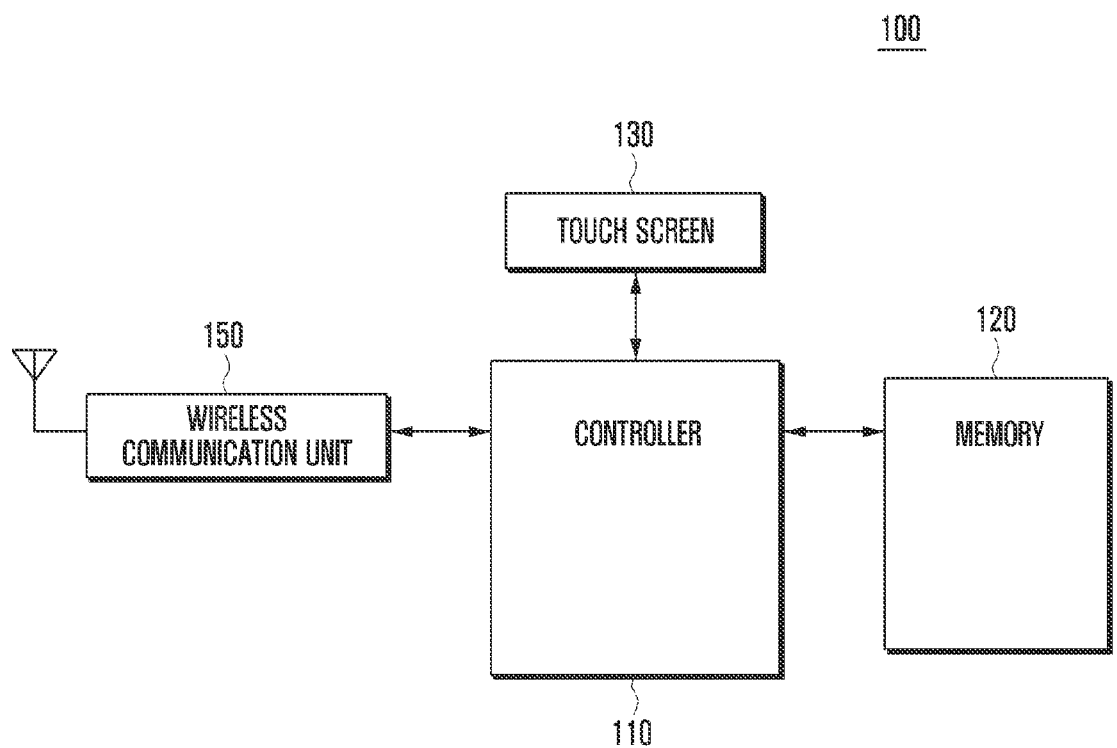
FIG. 11 is a block diagram illustrating a configuration of a mobile terminal according to an embodiment of the present disclosure.

FIG. 11 is a block diagram illustrating a configuration of a mobile terminal according to an embodiment of the present disclosure.

Referring to FIG. 11, the mobile terminal 100 according to an embodiment of the present disclosure includes a wireless communication unit 150, a touch screen 130, a memory 120, and a controller 110.

The wireless communication unit 150 supports a wireless communication function of the mobile terminal 100 and may be configured with a mobile communication module when the mobile terminal supports the mobile communication function. The wireless communication unit 150 includes a RF transmitter which up-converts and amplifies a frequency of the transmitted wireless signal, and an RF receiver which low-noise-amplifies the received wireless signal and down-converts the frequency. Moreover, when the mobile terminal 100 supports wireless local area network such as Wi-Fi, Bluetooth, Near Field Communication (NFC), and the like, the wireless communication unit 150 includes a Wi-Fi communication module, a Bluetooth communication module, an NFC communication module and the like. When the mobile terminal 100 does not support the wireless communication function, the wireless communication unit 150 may be omitted.

The touch screen 130 supports an output function and an input function. The touch screen 130 may include a display panel and a touch panel. Particularly, the touch screen 130 according to the present disclosure may recognize a general touch by user's finger and a touch by the touch pen. To this end, the touch panel is formed by combining a first panel for recognizing the general touch input with a second panel for recognizing the touch input and/or status information input by the touch pen 200. Otherwise, the first touch panel and the second touch panel may be formed as an integral type. For example, the first touch panel may be formed of a capacitive type, a resistive type, an ultra-sonic wave type, an IR type and the like, and the second touch panel may be formed of an electromagnetic induction type. The detailed description of the touch screen 130 is described further below with reference to FIG. 12.

The memory 120 may store an operating system of the mobile terminal 100, application programs for supporting other options such as a sound play function, an image or video play function, broadcast play function and the like, and user data and the data transmitted and received in communication. Particularly, the memory 120 according to the present disclosure stores a touch recognition program to recognize a touch input of the touch pen 200. The touch recognition program transmits a wireless signal to the touch pen 200, and recognizes a touch input and/or status information input of the touch pen 200 through the reflection signal received from the touch pen 200.

In detail, the touch recognition program analyzes at least one of reflection signals received from the touch pen 200, and recognizes at least one of a touch coordinate, pen pressure information, button input information, and ID information of the touch pen 200. For example, when the delay device of the touch pen 200 includes one output IDT and a reflector, and a pressure sensor and a button are connected to the output IDT in parallel, the touch recognition program recognizes location information through a first reflection signal by the output IDT, and recognizes pen pressure information and button input information through a variation of frequency, amplitude, and phase of the first reflection signal, and recognizes ID information of the touch pen by analyzing the second reflection signal which is generated by the reflector and received with a time delay with the first reflection signal.

The controller 110 controls a general operation of the mobile terminal 100 and a signal flow between internal blocks of the mobile terminal 100, and performs a data processing function for processing data. The controller 110 may be a Central Processing Unit (CPU), an application processor and the like. Particularly, the controller 110 according to the present disclosure controls recognition of a general touch input by a user's finger and a touch input by the touch pen 200. In addition, the controller 110 controls recognition of ID information, pen pressure information, button input information, sensor information, and the like provided from the touch pen 200 or 300.

Moreover, the controller 110 may control recognition of location information of the touch pen by using a wireless signal of the first frequency fp and status information of the touch pen by using a wireless signal of the second frequency fd. Furthermore, the controller 110 controls recognition of the touch pen by using multiple frequencies.

In the meantime, although not shown in FIG. 11, the mobile terminal 100 may selectively further include elements having an additional function such as a camera module for photographing a video or a still image, a broadcast reception module for broadcasting reception, a digital sound play module, and a motion sensor module for detecting motion of the mobile terminal 100 and the like. The above mentioned elements are so various according to convergence trend of a digital device that they cannot all be mentioned, but the mobile terminal 100 according to the present disclosure may further include elements equivalent to above mentioned elements.

Figure 12A:
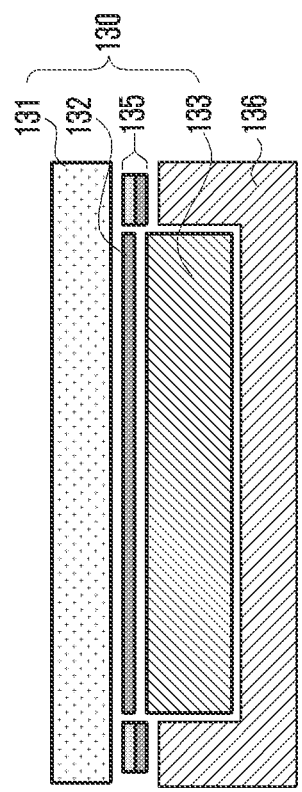
FIGS. 12A and 12B are diagrams illustrating a configuration of a touch screen according to an embodiment of the present disclosure.
Figure 12B:
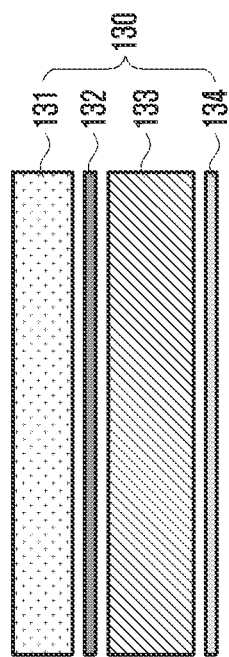

FIGS. 12A and 12B are diagrams illustrating a configuration of a touch screen according to an embodiment of the present disclosure.

Referring to FIG. 12A, the touch screen 130 may include a protection window 131, a first touch panel 132, a display panel 133, and a second touch penal 134.

The protection window 131 protects the first touch panel 132, the second touch panel 134, and the display panel 133 from being damaged. To this end, the protection window 131 may be formed of a tempered glass. The display panel 133 displays information input by a user or information provided for user in addition to various menus of the mobile terminal 100. For example, the display panel 133 displays various screens according to use of the mobile terminal 100 such as a lock image, a main menu screen, a home screen, an application screen and the like. Such a display panel 133 is formed of a Liquid Crystal Display (LCD), an Organic Light Emitted Diode (OLED) and the like.

The first touch panel 132 is a touch panel for recognizing a touch input by a finger and the like (hereinafter referred to general touch). The first touch panel 132 may use a capacitive type, a resistive type, an ultra-sonic wave type, and an IR type and the like. The second touch panel 134 is a touch panel for recognizing a touch input and/or status information input by a touch pen 200. The second touch panel 134 may use an electromagnetic induction method. The second touch panel 134 may include an antenna array (not shown) which transmits the wireless signal to the touch pen 200 and receives the reflection signal from the touch pen 200.

Next, referring to FIG. 12B, the touch screen 130 includes a protection window 131, a touch panel 132, a display panel 133, an antenna 135 for touch pen, and a bracket 136 for mounting the display panel 133. The touch screen 130 having such configuration does not have an additional touch panel for recognizing a touch input by the touch pen, but has a touch panel, which is commonly used, for recognizing a general touch input. At this time, in the touch screen 130, the antenna 135 for touch pen can alternatively or additionally be mounted on the outside of the touch panel 132.

This addresses the problem that the patterns of the touch panel 132 do not operate as an antenna when the touch panel 132 is driven to recognize the general touch, or that the touch panel does not recognize approach of the touch pen due to reception sensibility being reduced as a result of high resistance of a transparent electrode used as a pattern of the touch panel 132 despite it operating as the antenna. In other words, the mobile terminal 100 detects approach of the touch pen through the antenna 135 for the touch pen, and recognizes touch input of the touch pen by driving the patterns of the touch panel 132 as the antenna. The antenna 135 for the touch pen may be embedded on a Black Mark (BM) area where the screen is not displayed as shown in FIG. 12B.

Figure 13:
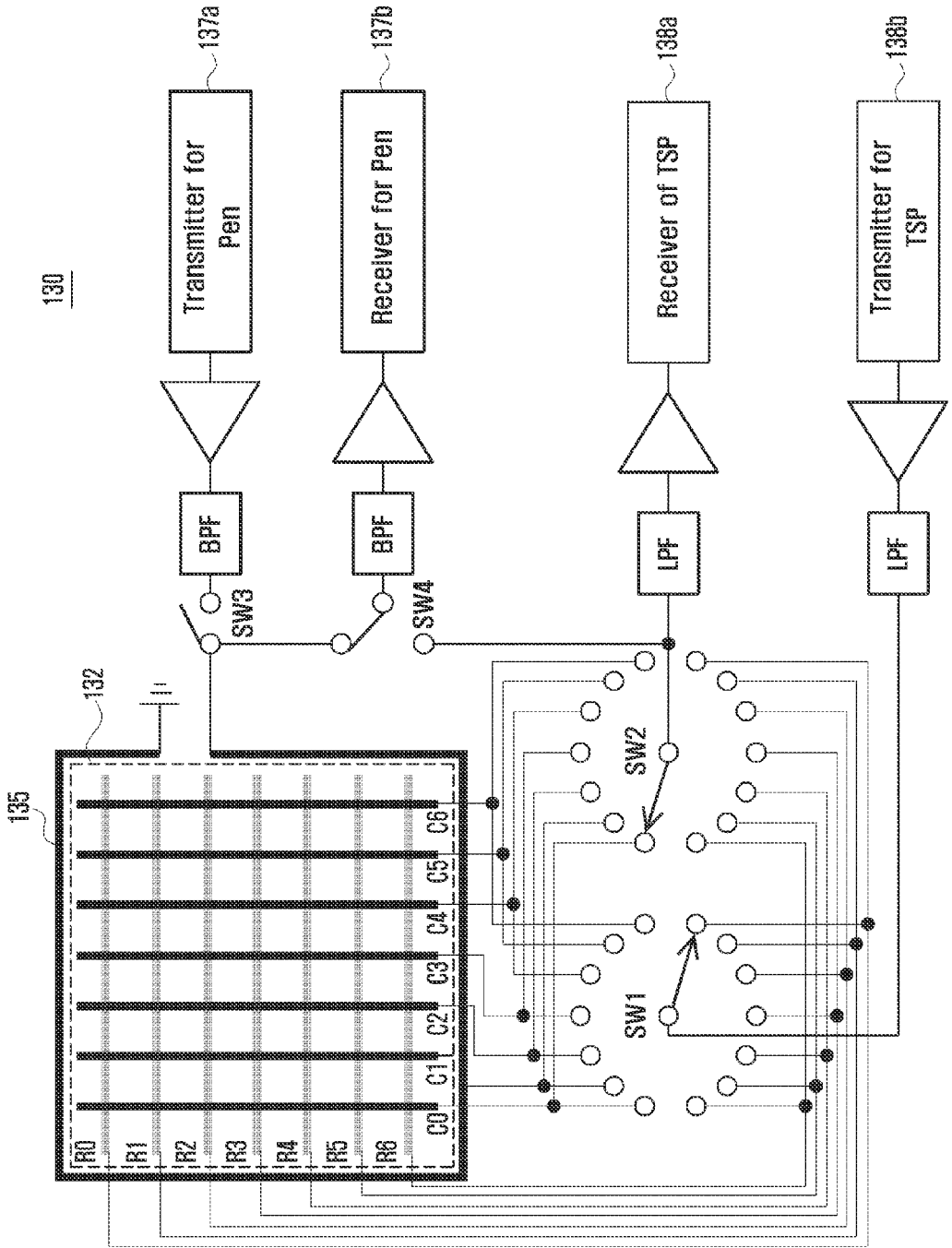
FIG. 13 is a diagram illustrating a method for recognizing location information and status information of a touch pen according to the first embodiment of the present disclosure.

FIG. 13 is a diagram illustrating a method for recognizing location information and status information of a touch pen according to the first embodiment of the present disclosure.

Referring to FIG. 13, the touch panel 132 may include a plurality of sensing electrodes (e.g., R0, R1, R2, R3, R4, R5, and R6) for recognizing a coordinate of X axis (or a horizontal axis) and a plurality of sensing electrodes (e.g., C0, C1, C2, C3, C4, C5, and C6) for recognizing a coordinate of Y axis (or a vertical axis). The plurality of the sensing electrodes is formed of a transparent electrode. The plurality of the sensing electrodes is connected to a first switch SW1 or a second switch SW2.

The first switch SW1 includes an input terminal connected to a Touch Screen Panel (TSP) transmitter 138b for detecting the general touch input, and a plurality of output terminals connected to the plurality of sensing electrodes respectively. Similarly, the switch SW2 includes an input terminal connected to a TSP receiver 138a for detecting the general touch input and a plurality of output terminals connected to the plurality of sensing electrodes respectively. The input terminal of the second switch SW2 is connected to the one side of a fourth switch SW4.

A third switch SW3 may be connected to a pen transmitter 137a for recognizing a touch input of the touch pen and an antenna 135 for the touch pen. The third switch SW3 is switched to connect the antenna 135 for the touch pen with the pen transmitter 137a, or to connect the antenna 135 for the touch pen with the pen receiver 137b for recognizing a touch input of the touch pen through the fourth switch SW4. The fourth switch SW4 is switched to connect the pen receiver 137b with the antenna 135 for the touch pen through the third switch SW3, or to connect the pen receiver 137b with the second switch SW2.

A method for sensing a touch input by a touch pen through the touch screen 130 having the above described configurations is described below in more detail.

The controller 110 of the mobile terminal 100 periodically turns on the third switch SW3 and transmits a wireless signal through the antenna 135 for the touch pen, and then turns off the third switch SW3 and receives a reflection signal which is input from the touch pen 200 or 300 by controlling the fourth switch SW4 to connect the antenna 135 for the touch pen with the pen receiver 137b to detect the use of the touch pen.

If the use of the touch pen is not detected, the controller 110 recognizes the general touch input through the touch panel 132. In detail, the controller 110 recognizes the general touch input by using the TSP receiver 138a and the TSP transmitter 138b. In the meantime, when the use of the touch pen is detected, the controller 110 recognizes the touch input by the touch pen by using the sensing electrodes of the touch panel 132.

In detail, the controller 110 of the mobile terminal 100 controls the fourth switch SW4 to connect the pen receiver 137b with an input terminal of the second switch SW2, and senses the X axis electrode and the Y axis electrode through the second switch SW2, and detects a location of the touch pen through the sensing result. After that, when the touch pen is not detected, the controller 110 controls the fourth switch SW4 to connect the pen receiver 137b with the antenna 135 for the touch pen through the third switch SW3.

In the meantime, hereinabove, it is described that the location of the touch pen is detected through the sensing electrode of the touch panel 132 when the touch pen is detected, but the present disclosure is not limited thereto. That is, in another embodiment of the present disclosure, the use of the touch pen and the status information of the touch pen (e.g., a pen pressure, ID information, button input information and the like) can be determined through the antenna 135 for the touch pen, and the location of the touch pen can be recognized through the sensing electrodes of the touch panel 132 when a status change (e.g., a variation of the pen pressure) is detected.

Figure 14:
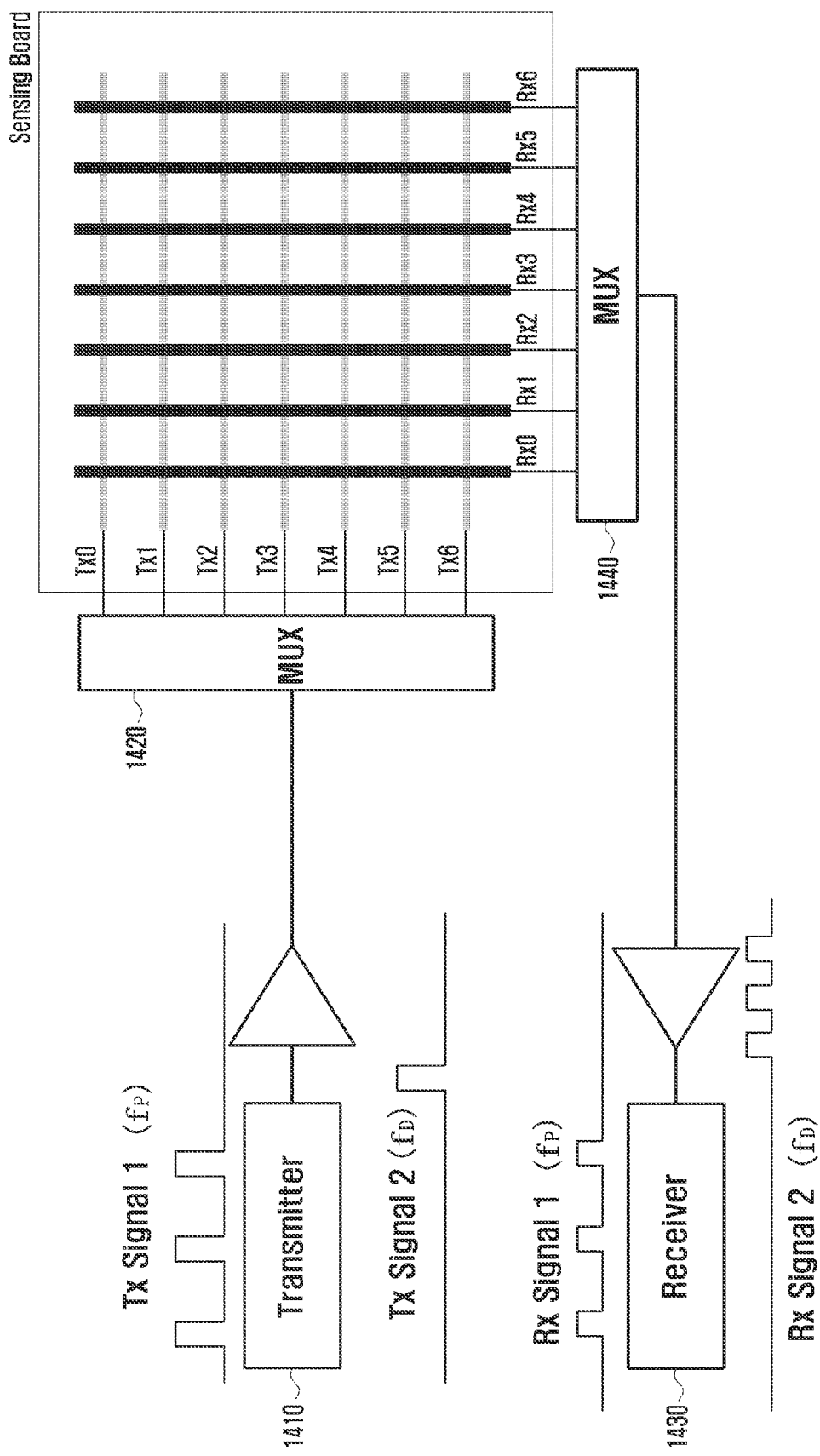
FIG. 14 is a diagram illustrating a method for recognizing location information and status information of a touch pen according to the second embodiment of the present disclosure.

FIG. 14 is a diagram illustrating a method for recognizing location information and status information of a touch pen according to the second embodiment of the present disclosure.

Referring to FIG. 14, a mobile terminal according to the second embodiment of the present disclosure includes a transmitter 1410 for transmitting a wireless signal of a first frequency fp for recognizing location information of the touch pen 200 and a second frequency fd for recognizing status information of the touch pen 200, a first multiplexer 1420 for providing an output signal of the transmitter 1410 to transmission lines (e.g., Tx0, Tx1, Tx2, Tx3, Tx4, Tx5, and Tx6) of a second touch panel 134, a receiver 1430 for receiving a reflection signal corresponding to the first frequency fp and the second frequency fd, and a second multiplexer 1440 for outputting signals which are received from a plurality of reception lines (e.g., Rx0, Rx1, Rx2, Rx3, Rx4, Rx5, and Rx6) of the second touch panel 134 to the receiver 1430.

The mobile terminal 100 having above mentioned configuration transmits a wireless signal of the first frequency fp through the transmitter 1410. At this time, the first multiplexer 1420 provides the wireless signal of the first frequency fp to the first transmission line Tx0 to the seventh transmission line Tx6 sequentially. The second multiplexer 1440 transmits the reflection signals corresponding to the first frequency fp input from the first reception line Rx0 to the seventh reception line Rx6 to receiver 1430.

Specifically, it is checked whether the wireless signal of the first frequency fp is transmitted through the first transmission line Tx0, and the reflection signal corresponding to the first to the seventh reception line (i.e., Rx0 to Rx6) is received. In this case, when the second to the fourth reception line (i.e., Rx1, Rx2, Rx3) receive the reflection signal and magnitude of the signal at the third reception line Rx2 is the biggest, the mobile terminal can determine that the touch pen is positioned at a coordinate (1,3). This procedure is sequentially performed for the second to the seventh transmission line (i.e., Tx1 to Tx6).

In the meantime, in the case of having the configuration of FIG. 14, the mobile terminal can recognize a single touch and multiple touches, and scans 49 times (=the number of transmission electrodes 7*the number of reception electrodes 7) for recognition of the multiple touches. Thus, the present disclosure can recognize the single touch and the multiple touches. To improve an accuracy of touch recognition through the plurality of measurement, the mobile terminal transmits the wireless signal with predetermined numbers according to a preset period.

As described above, when the recognition of location information of the touch pen is completed using the first frequency fp, the mobile terminal transmits the wireless signal of second frequency fd through the first transmitter 1410. At this time, the first multiplexer 1420 transmits the wireless signal of the second frequency fd only to the reception lines located around the touch pen based on the recognized location information, and receives the reflection signal corresponding to the wireless signal of the second frequency fd through the neighboring transmission lines.

For example, when the touch pen is positioned at a coordinate (3, 4), the transmitter 1410 transmits the wireless signal of the second frequency fd through the second transmission line Tx1 to the fourth transmission line Tx3, and receives the reflection signal corresponding to the wireless signal of the second frequency fd through the third reception line Rx2 to the fifth reception line Rx4.

Figure 15:
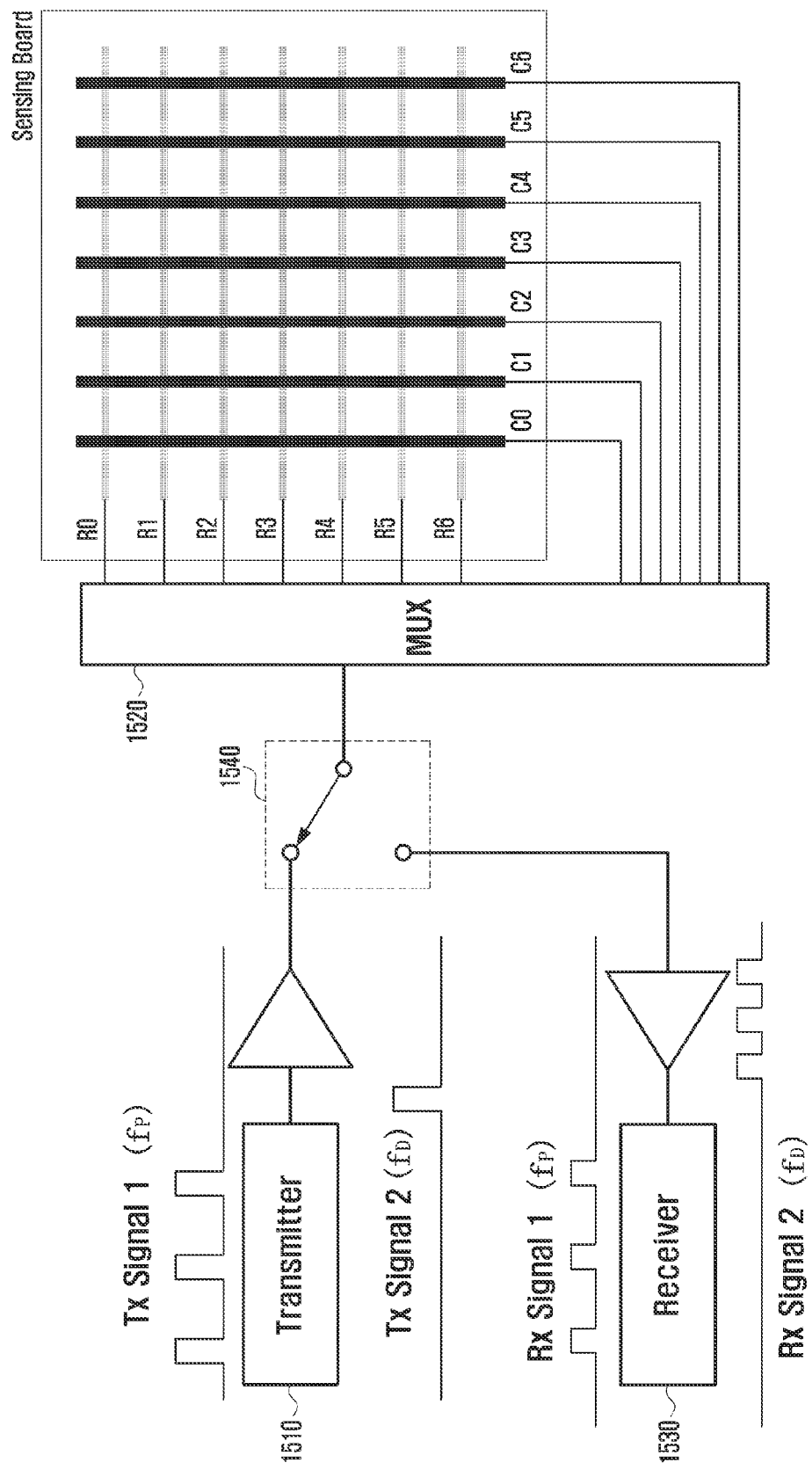
FIG. 15 is a diagram illustrating a method for sensing location information and status information of a touch pen according to a third embodiment of the present disclosure.

FIG. 15 is a diagram illustrating a method for sensing location information and status information of a touch pen according to the third embodiment of the present disclosure.

Referring to FIG. 15, a mobile terminal includes a transmitter 1510, a multiplexer 1520, a receiver 1530, and a switch 1540. The mobile terminal having such a configuration transmits a wireless signal of the first frequency fp through the transmitter 1510. To this end, the switch 1540 connects the transmitter 1510 with the multiplexer 1520.

The multiplexer 1520 provides the first transmission electrode R0 to the seventh transmission electrode R6 with the wireless signal of the first frequency fp, and receives the reflection signal corresponding to the first frequency fp through the first reception electrode C0 to the seventh reception electrode C6 to transmit to the receiver 1530. To this end, the switch 1540 is switched to connect the multiplexer 1520 with the receiver 1530.

In a case of having the configuration of FIG. 15, the mobile terminal can recognize a single touch and uses 14 scans (=the number of transmission electrode 7 +the number of reception electrode 7) to recognize the single touch. To improve an accuracy of touch recognition through the plurality of measurements, the transmitter 1510 transmits the wireless signal a predetermined number of times according to a preset period.

As described above, when the recognition of location information of the touch pen is completed using the first frequency fp, the mobile terminal transmits the second frequency fd through the first transmitter 1510. The multiplexer 1520 transmits the wireless signal of the second frequency fd by using transmission electrodes located around the touch pen based on the recognized location information, and receives the reflection signal corresponding to the wireless signal of the second frequency fd through the neighboring reception electrodes.

Figure 16:
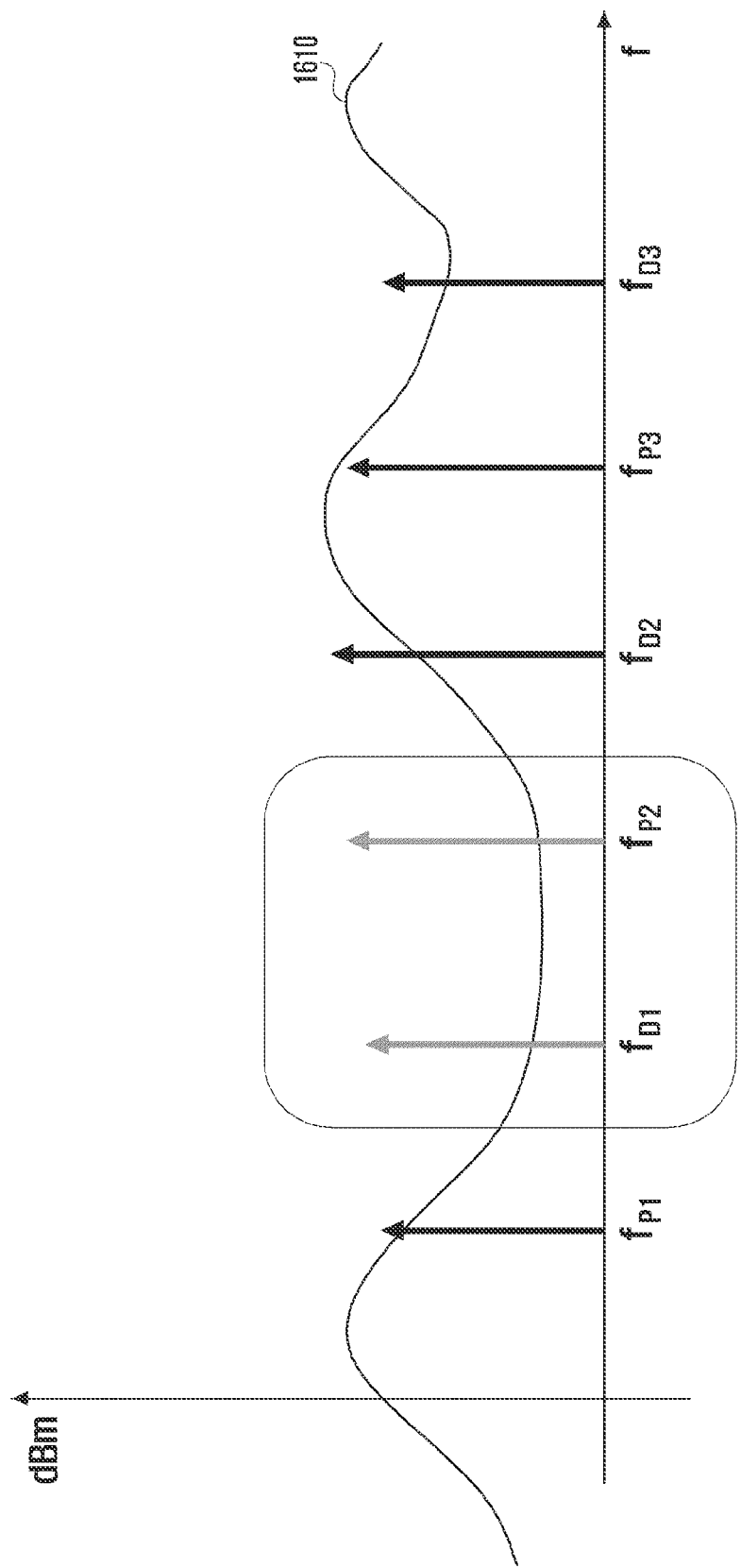
FIG. 16 is a diagram illustrating a method for improving touch sensitivity by utilizing multiple frequencies according to an embodiment of the present disclosure.

FIG. 16 is a diagram illustrating a method for improving touch sensitivity by using multiple frequencies according to an embodiment of the present disclosure.

Referring to FIG. 16, the mobile terminal includes various noise signals. For examples, the noise signals exist on a very wide frequency band as shown in a noise curve 1610 of FIG. 16, and have different levels according to the frequency band. Such noise signals have a different type according to the mobile terminal and may cause errors of touch pen recognition. Thus, the wireless signal for recognition of the touch pen may preferably use a frequency of a band having a low noise level. For example, as shown in FIG. 16, when the touch pen supports three frequencies fp1, fp2, and fp3 for detection of the location information and three frequencies fd1, fd2, and fd3 for detection of the status information, it is preferable to use frequencies fd1 and fp2 which have the lowest noise level, i.e., a satisfactory SNR.

To this end, the mobile terminal measures a noise level for multiple frequencies supported by the touch pen, and selects a frequency which has the best SNR among the supported multiple frequencies to transmit the wireless signal to the touch pen. At this time, when the first frequency fp for recognition of the location information and the second frequency fd for recognition of the status information support the multiple frequencies as shown in FIG. 16, the mobile terminal 100 may independently select the frequency for recognition of location information and status information.

Figure 17:
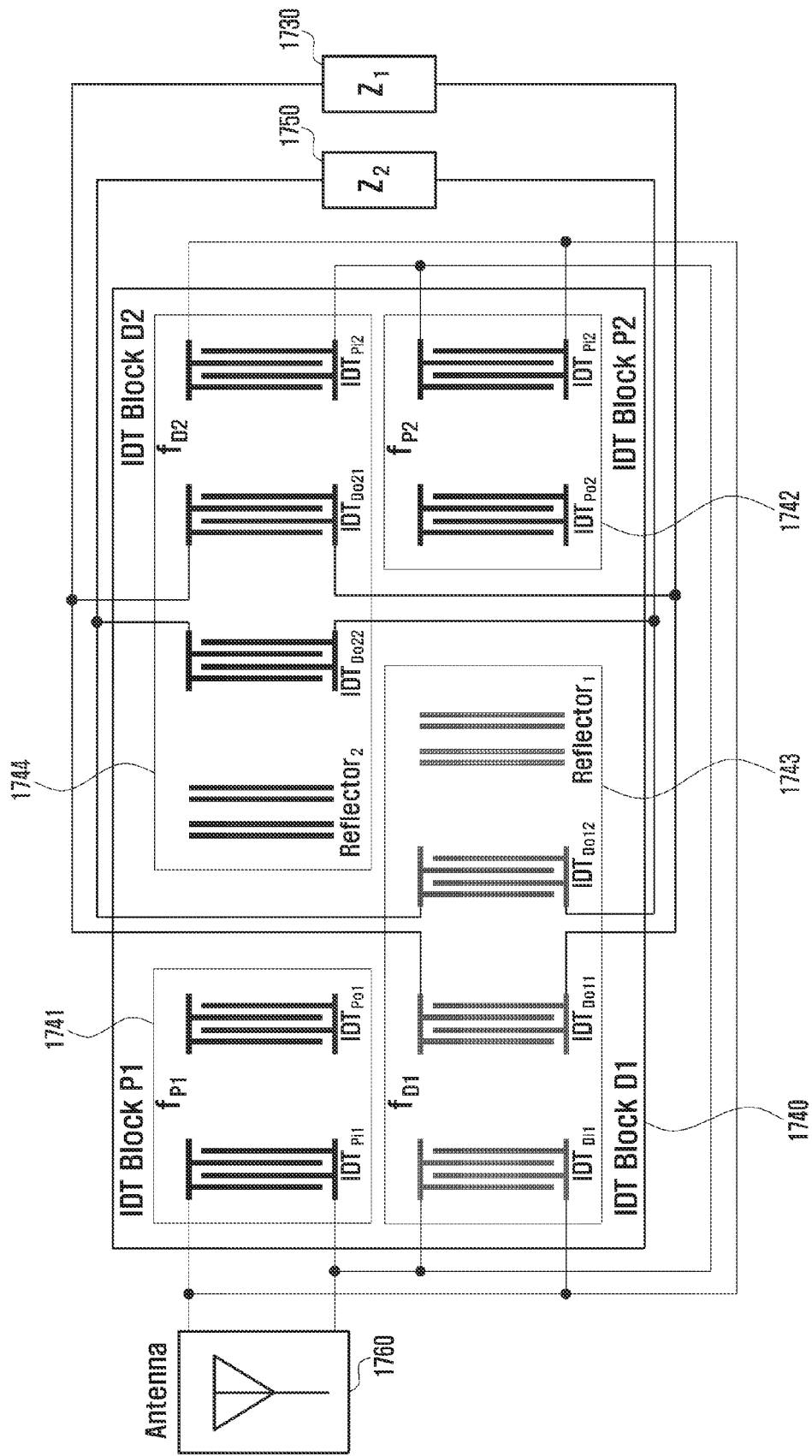
FIG. 17 is a view schematically illustrating a touch pen supporting multiple frequencies according to an embodiment of the present disclosure.

FIG. 17 is a view schematically illustrating a touch pen supporting multiple frequencies according to an embodiment of the present disclosure.

Referring to FIG. 17, a touch pen supporting multiple frequencies includes an antenna 1760, a delay device 1740, a pressure sensor 1750, and a button 1730.

The antenna 1760 transmits and receives wireless signal of the multiple frequencies to and from the mobile terminal. For example, the antenna 1760 may receive a wireless signal of two frequencies fp1 and fp2 for recognition of the location information, and a wireless signal of two frequencies fd1 and fd2 for recognition of the status information from the mobile terminal. Alternatively, the antenna 1760 may transmit a reflection signal corresponding to the wireless signal of two frequencies fp1 and fp2 for recognition of the location information, and a reflection signal of the wireless signal of two frequencies fd1 and fd2 for recognition of the status information to the mobile terminal.

The delay device 1740 may include a plurality of IDT blocks for support of the multiple frequencies. For example, the delay device 1740 may include a first IDT block 1741 and a second IDT block 1742 for providing location information and a third IDT block 1743 and a fourth IDT block 1744 for providing status information.

The pressure sensor 1750 and the button 1730 connect to the output IDTs of the third IDT block 1743 and the fourth IDT block 1744 for providing status information for providing status information, so as to provide pen pressure information and button input information.

The touch pen supporting the multiple frequencies receives the wireless signal of the selected frequency from the mobile terminal by the same method as described in FIG. 16, and transmits the reflection signal corresponding to the wireless signal to the mobile terminal through the IDT blocks for providing location information and status information supporting a corresponding frequency.

Figure 18:
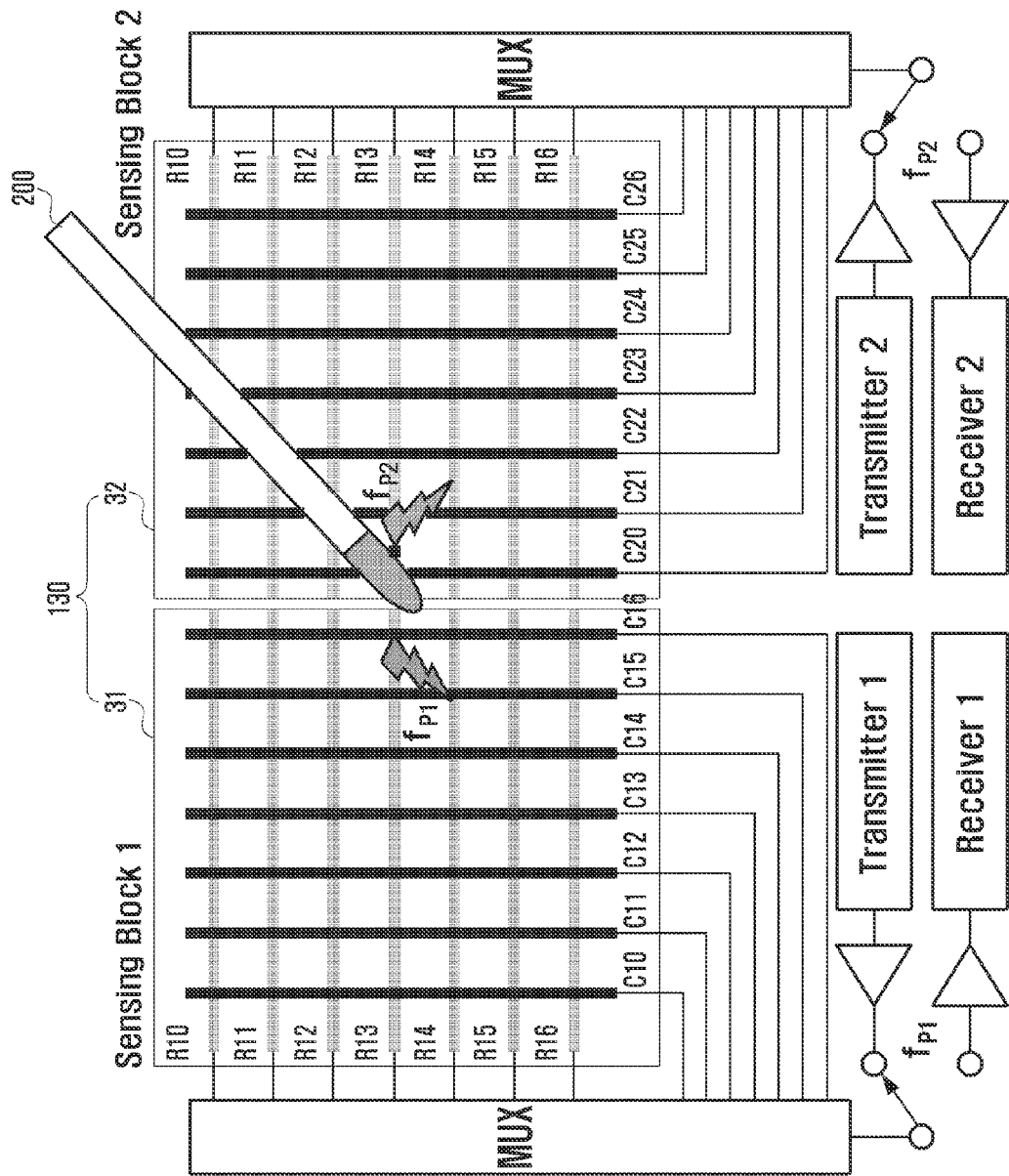
FIG. 18 is a diagram illustrating a method for sensing location information of a touch pen by using multiple frequencies according to an embodiment of the present disclosure.

FIG. 18 is a diagram illustrating a method for sensing location information of a touch pen by using multiple frequencies according to an embodiment of the present disclosure.

Referring to FIG. 18, the fourth embodiment according to the present disclosure divides a touch screen into a plurality of areas, and simultaneously scans each divided area with different frequency. This is designed to address a problem of an increase of scan time when the number of the lines of horizontal axis and vertical axis increases as the touch screen has a bigger size or a higher resolution. That is, the scan time increases since the number of scans is increased as the number of the lines of horizontal axis and vertical axis is increased. Thus, the speed of touch reaction is reduced.

For example, the touch screen 130 may be divided into a first area 31 and a second area 32 as shown in FIG. 18. After that, the mobile terminal scans the first area 31 by using a wireless signal of a first frequency fp1 and the second area 32 by using a wireless signal of a second frequency fp2. The mobile terminal is able to scan the first area 31 and the second area 32 by using a sensing method according to the third embodiment as illustrated in FIG. 15. Moreover, the mobile terminal is able to scan the first area 31 and the second area 32 by using a sensing method according to the second embodiment as illustrated in FIG. 14.

The touch pen using the delay device and the touch input method thereof and the tough input system and the method thereof according to the present disclosure can provide status information through not only a frequency change but also a time delay using the delay device, such that it can provide much more status information compared with the related-art touch pen employing electromagnetic resonance by using the LC resonance circuit. As described above, the utilization of the touch pen can be increased as more status information can be provided to the mobile terminal. Moreover, errors due to environmental factors may be reduced by using the delay device instead of an LC resonance circuit that is sensitive to environmental factors such as temperature.

Furthermore, the touch pen according to the present disclosure provides the reflection signal to the mobile terminal by using the delay device after a predetermined time elapses. Thus, the SNR is improved because the mobile terminal receives the reflection signal of the touch pen after a noise caused by a neighboring reflection wave has disappeared. That is, the present disclosure may reduce touch errors. Moreover, according to the present disclosure, the production efficiency can be improved by using the delay device having a small component deviation while not using the capacitor and the inductor which have a large component deviation.

Further, the speed of the touch recognition may be increased by providing a frequency for recognition of location information and a frequency for recognition of status information separately. In addition, the present disclosure can control to support multiple frequencies and to use the frequency having a high signal to noise ratio. Therefore, the present disclosure can improve the touch performance. In addition, when touch recognition is difficult due to a large size and high resolution of the touch screen, the present disclosure can divide the touch screen into the plurality of areas, and can simultaneously perform touch recognition for the divided areas by using the wireless signals having a different frequency, such that rapid touch recognition can be performed.

While the present disclosure has been described with reference to various embodiments thereof, it will be understood by those skilled in the art that various changes in form and details may be made therein without departing from the spirit and scope of the present disclosure as defined by the appended claims and their equivalents.

What is claimed is:

1. A touch pen comprising:
   a body;
   an antenna configured to receive a wireless signal from a mobile terminal; and
   a delay device configured to:
   receive the wireless signal from the antenna,
   convert the wireless signal into an acoustic wave, and
   output a reflection signal, corresponding to the acoustic wave, to the antenna after a predetermined time elapses,
   wherein the antenna transmits the reflection signal to the mobile terminal.

2. The touch pen of claim 1, wherein the delay device comprises:
   an input Inter-Digital Transducer (IDT) configured to:
   receive an electric signal corresponding to the wireless signal from the antenna, and
   output a surface acoustic wave converted from the received electric signal; and
   an output IDT configured to:
   receive the converted surface acoustic wave,
   convert the received surface acoustic wave into an electric signal,
   generate a reflection signal corresponding to the converted electric signal, and
   retransmit the surface acoustic wave reconverted from the generated reflection signal to the input IDT,
   wherein the input IDT receives the surface acoustic wave which is retransmitted from the output IDT and converts the surface acoustic wave into an electric signal to output to the antenna.

3. The touch pen of claim 2, wherein the reflection signal is a signal which is changed from at least one of frequency, phase, and amplitude of the wireless signal according to variation of load impedance of the output IDT.

4. The touch pen of claim 1, wherein the delay device further comprises at least one of:
   a reference Inter-Digital Transducer (IDT) configured to generate a reference signal; and
   a reflector configured to provide IDentifier (ID) information of the touch pen.

5. The touch pen of claim 1, further comprising:
   at least one sensor configured to collect information,
   wherein the delay device further comprises at least one sensor IDT connected to the at least one sensor respectively, which provides sensor information collected through the at least one sensor.

6. The touch pen of claim 1, further comprising:
   a pen nib that is movable and installed on the body;
   a pressure sensor connected to the delay device in one of series and parallel, and having an impedance that is changed according to a pressure applied by the pen nib;
   a button embedded on one side of the body; and
   an impedance device connected to the button in series,
   wherein the button and the impedance device are connected to the delay device in parallel.

7. The touch pen of claim 1, wherein the delay device comprises:
   a location information provider configured to:
   receive a wireless signal of a first frequency to recognize a location of the touch pen, and output a reflection signal corresponding to the wireless signal of the first frequency; and a status information provider configured to
receive a wireless signal of a second frequency to recognize status information of the touch pen, and
output a reflection signal corresponding to the wireless signal of the second frequency.

8. The touch pen of claim 7, wherein the status information of the touch pen includes at least one of pen pressure information of the touch pen, button input information, IDentifier (ID) information, and sensor information, and each status information comprises a different time delay value and is included in the reflection signal corresponding to the wireless signal of the second frequency.

9. The touch pen of claim 1, wherein the delay device comprises:
a plurality of Inter-Digital Transducer (IDT) blocks to support multiple frequencies.

10. A touch input system comprising:
a touch pen including:
an antenna, and
a delay device configured to:
receive a wireless signal through the antenna,
convert the wireless signal into an acoustic wave,
generate a reflection signal corresponding to the acoustic wave after a predetermined time elapses, and
transmit the generated reflection signal through the antenna; and
a mobile terminal configured to:
transmit the wireless signal to the touch pen,
receive the reflection signal generated by the delay device, and
recognize location information and status information of the touch pen.

11. The touch input system of claim 10, wherein the status information of the touch pen includes at least one of pen pressure information of the touch pen, button input information, IDentifier (ID) information, and sensor information.

12. The touch input system of claim 10, wherein the mobile terminal is further configured to recognize the status information of the touch pen through at least one of frequency, amplitude, and phase of the reflection signal which is changed according to variation of a load impedance of the delay device.

13. The touch input system of claim 10,
wherein the touch pen is configured to transmit a plurality of reflection signals corresponding to the wireless signal with a time delay to the mobile terminal, and
wherein the mobile terminal is configured to recognize the status information of the touch pen through the plurality of reflection signals transmitted with the time delay.

14. The touch input system of claim 10,
wherein the mobile terminal comprises a touch screen configured to receive a touch input, and
wherein the touch screen comprises:
a protection window,
a touch panel located at an lower end of the protection window and including a plurality of sensing electrodes,
an antenna for the touch pen embedded along an edge of the touch panel,
a display panel configured to display a screen, and
a bracket embedding the display panel.

15. The touch input system of claim 14, wherein the mobile terminal is further configured to:

sense an approach of the touch pen through the antenna for the touch pen, and
detect a location of the touch pen through a plurality of sensing electrodes of the touch panel when sensing the approach of the touch pen.

16. The touch input system of claim 14, wherein the mobile terminal is further configured to recognize the status information of the touch pen through the antenna for the touch pen.

17. The touch input system of claim 14, wherein the mobile terminal is further configured to detect a location of the touch pen through the plurality of sensing electrodes of the touch panel when sensing the change of pen pressure of the touch pen through the antenna for the touch pen.

18. The touch input system of claim 10, wherein the wireless signal comprises:
a wireless signal of first frequency configured to recognize location information of the touch pen; and
a wireless signal of second frequency configured to recognize status information of the touch pen.

19. The touch input system of claim 10, wherein the wireless signal comprises multiple frequencies and the mobile terminal is configured to select a frequency having the best signal-to-noise ratio among the multiple frequencies to transmit to the touch pen.

20. The touch input system of claim 10, wherein the mobile terminal is further configured to:
divide the touch screen into a plurality of areas, and
recognize a location of the touch pen by simultaneously scanning the plurality of divided areas by using a different frequency.

21. A method of inputting a touch, the method comprising:
transmitting a wireless signal for recognizing location information and status information of a touch pen by a mobile terminal;
receiving the wireless signal transmitted from the mobile terminal through an antenna by the touch pen;
receiving the wireless signal from the antenna;
outputting a reflection signal corresponding to the received wireless signal to the antenna after a predetermined time elapses by a delay device of the touch pen, wherein the predetermined time is associated with converting the wireless signal into an acoustic wave;
transmitting the reflection signal to the mobile terminal through the antenna of the touch pen;
receiving the reflection signal by the mobile terminal; and
recognizing at least one of the location information and the status information of the touch pen by analyzing the reflection signal by the mobile terminal.

22. The method of claim 21, wherein the outputting of the reflecting signal to the antenna comprises converting an electric signal into a surface acoustic wave and reconverting the converted surface acoustic wave into an electric signal.

23. The method of claim 21, wherein the transmitting of the wireless signal comprises:
transmitting a wireless signal of a first frequency for recognizing the location information of the touch pen; and
transmitting a wireless signal of a second frequency for recognizing status information of the touch pen.

24. The method of claim 21, wherein the recognizing of the status information of the touch pen comprises:
recognizing through a change of at least one of frequency, amplitude, and phase of the reflection signal; and
recognizing through a plurality of reflection signals which are received with a time delay.

25. The method of claim 21, wherein the transmitting of the wireless signal comprises:

measuring a signal-to-noise ratio corresponding to each frequency when the touch pen supports multiple frequencies;
selecting a wireless signal of the frequency which comprises the best signal-to-noise ratio based on the measurement result; and
transmitting the wireless signal of the selected frequency.

26. The method of claim 21, further comprising:
dividing a touch screen of the mobile terminal into a plurality of areas and allocating one of the multiple frequencies to the divided areas respectively when the touch pen supports multiple frequencies,
wherein the transmitting of the wireless signal comprises transmitting all the multiple frequencies which the touch pen supports, and
wherein the receiving of the reflection signal comprises receiving each reflection signal corresponding to the multiple frequencies from the divided and allocated area of the touch screen.

27. A method of inputting a touch of a touch pen, the method comprising:
receiving a wireless signal through an antenna;
delaying the received wireless signal for a predetermined time by using a delay device, wherein the predetermined time is associated with converting the wireless signal into an acoustic wave;
outputting a reflection signal corresponding to the wireless signal to the antenna; and
transmitting the reflection signal through the antenna.

28. The method of claim 27, wherein the reflection signal comprises location information and status information of the touch pen.

29. The method of claim 28, wherein the status information includes at least one of pen pressure information of the touch pen, button input information, IDentifier (ID) information and sensor information.

30. The method of claim 29, wherein each status information comprises a different time delay value when there is a plurality of the status information.

31. The method of claim 27, wherein the reflection signal is a signal where at least one of frequency, amplitude, and phase is changed according to a change of load impedance of the delay device.

32. The method of claim 27, wherein the receiving of the reflection signal comprises:
receiving a wireless signal of a first frequency for recognizing location information of the touch pen; and
receiving a wireless signal of a second frequency for recognizing status information of the touch pen.

* * * * *